United States Patent [19]

Kaufman

[11] Patent Number: 4,987,554
[45] Date of Patent: Jan. 22, 1991

[54] METHOD OF CONVERTING CONTINUOUS THREE-DIMENSIONAL GEOMETRICAL REPRESENTATIONS OF POLYGONAL OBJECTS INTO DISCRETE THREE-DIMENSIONAL VOXEL-BASED REPRESENTATIONS THEREOF WITHIN A THREE-DIMENSIONAL VOXEL-BASED SYSTEM

[75] Inventor: Arie E. Kaufman, Plainview, N.Y.

[73] Assignee: The Research Foundation of State University of New York, Albany, N.Y.

[21] Appl. No.: 235,982

[22] Filed: Aug. 24, 1988

[51] Int. Cl.$^5$ .......................................... G06F 15/40
[52] U.S. Cl. .................................... 364/522; 364/521
[58] Field of Search ........... 364/518, 522, 521, 413.13, 364/413.15, 413.16, 413.18, 413.19, 413.22, 474.36; 340/727, 747

[56] References Cited

U.S. PATENT DOCUMENTS

| | | | |
|---|---|---|---|
| 4,314,351 | 2/1982 | Postel et al. | 340/720 |
| 4,371,933 | 2/1983 | Bresenham et al. | 364/300 |
| 4,593,372 | 6/1986 | Bandai et al. | 364/719 |
| 4,685,070 | 8/1987 | Flinchbaugh | 364/521 |
| 4,710,876 | 12/1987 | Cline et al. | 340/727 |
| 4,719,585 | 1/1988 | Cline et al. | 364/521 |
| 4,729,098 | 3/1988 | Cline et al. | 364/521 X |
| 4,737,921 | 4/1988 | Goldwasser et al. | 364/521 X |

OTHER PUBLICATIONS

"A 3-D Cellular Frame Buffer" by Arie Kaufman and R. Bakalash, in Proc. EUROGRAPHICS '85, Nice, France, Sep. 1985, pp. 215-220.
"Memory Organization for a Cubic Frame Buffer" by Arie Kaufman in Proc. EUROGRAPHICS '86, Lisbon, Portugal, Aug. 1986, pp. 93-100.
"Towards a 3-D Graphics Workstation" by Arie Kaufman, in Advances in Graphics Hardware I, W. Strasser (Ed.), Springer Verlag, 1987, pp. 17-26.
"Voxel-Based Architectures for Three-Dimensional Graphics" by Arie Kaufman, in Proc. IFIP '86, 10th World Computer Congress, Dublin, Ireland, Sep. 1986, pp. 361-366.
"Cube—An Architecture Based on a 3D Voxel Map" by A. Kaufman and R. Bakalash, in Parallel Processing for Computer Vision and Display by P. M. Dew, R. A. Earnshaw and T. R. Heywood (Eds.), Addison-Wesley, 1988.
"Memory and Processing Architecture for 3-D Voxel-Based Imagery" by A. Kaufman and R. Bakalash, in IEEE Computer Graphics and Applications, 1988.
"The CUBE Three-Dimensional Workstaiton" by A. Kaufman, in Proc. NCGA '88: Ninth Annual Conference and Exposition, Anaheim, Calif., Mar. 1988.
"3-D Scan-Conversion Algorithms for Voxel-Based Graphics" by Arie Kaufman and Eyal Shimony, in Proc. 1986 ACM Workshop on Interactive 3-D Graphics held in Chapel Hill, N.C. on October 1986, pp. 45-76.
"Back-to-Front Display of Voxel-Based Objects", IEEE CG&A, Jan. 1985, pp.52-60 by Frieder et al.
"Real-Time Display and Manipulation of 3-D Medical Objects: The Voxel Processor Architecture," Computer Vision, Graphics, and Image Processing, 1987, pp. 1-27, by Goldwasser et al.
"Generating Octree Models of 3D Objects from Their Silhouttes in a Sequence of Images," Computer Vision, Graphic and Image Processing, 1987, pp. 1-29, by Potmesil.
"Surface Reconstruction of 3D Object in Computerized Tomography," Computer Vision, Graphics, and Image Processing, 1988, pp. 270-278 by Xu et al.

Primary Examiner—Dale M. Shaw
Assistant Examiner—H. R. Herndon
Attorney, Agent, or Firm—Hoffman & Baron

[57] ABSTRACT

A method of converting continuous 3-D (three dimension) geometrical representations of polygonal objects into a discrete set of voxels in discrete 3-D voxel space. In one embodiment, a method is provided for converting a continuous 3-D polygon into a discrete set of voxels connected together in discrete 3-D voxel space. In this embodiment, voxel-based polygons having a wide variety of connectivities are generated. In another embodiment, a method is provided for converting a continuous 3-D polyhedron into a discrete set of voxels connected together in discrete 3-D voxel space. The method is incremental in nature and uses all integer arithmetic. The method is also characterized by decisional process loops, rather than brute-force type computational loops characteristic of prior art methodologies.

14 Claims, 20 Drawing Sheets

Neighbors That Share a Face

Neighbors That Share a Side

6-Connected Neighbors

Neighbors That Share a Corner

26-Connected Neighbors

18-Connected Neighbors

18—Connected Path

6—Connected Path

26—Connected Path

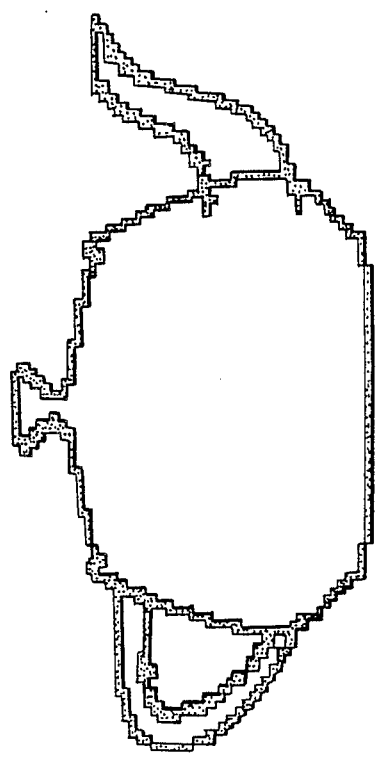
FIG. 8B
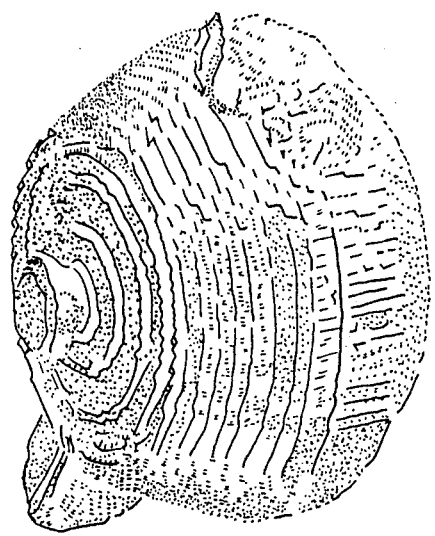
FIG. 8A
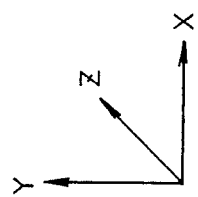

```
Δx = x₂ - x₁; Δy = y₂ - y₁; Δz = z₂ - z₁;
n = MAX(Δx, Δy, Δz);
" Initialization for x, y, and z "
x = x₁;
eₓ = 2 * Δx - n;                    " error variable along x "
d1ₓ = 2 * Δx;                       " increment along x for eₓ < 0 "
d2ₓ = 2 * (Δx - n);                 " increment along x for eₓ ≥ 0 "

y = y₁;
e_y = 2 * Δy - n;                   " error variable along y "
d1_y = 2 * Δy;                      " increment along y for e_y < 0 "
d2_y = 2 * (Δy - n);                " increment along y for e_y ≥ 0 "

z = z₁;
e_z = 2 * Δz - n;                   " error variable along z "
d1_z = 2 * Δz;                      " increment along z for e_z < 0 "
d2_z = 2 * (Δz - n);                " increment along z for e_z ≥ 0 "
WRITE_VOXEL (x, y, z, c);           " first endpoint of line "
for (i = 1; i ≤ n; i++)             " follow the line "
{
    if(eₓ < 0)                      " then: no change in x "
        eₓ += d1ₓ;                  " update eₓ "
    else {
        eₓ += d2ₓ;                  "update eₓ, and "
        x++;                        " step in x "
    }
    if(e_y < 0)                     " then: no change in y "
        e_y += d1_y;                " update e_y "
    else {
        e_y += d2_y;                " update e_y, and "
        y++;                        " step in y "
    }
    if(e_z < 0)                     " then: no change in z "
        e_z += d1_z;                " update e_z "
    else {
        e_z += d2_z;                " update e_z, and "
        z++;                        " step in z "
    }
    WRITE_VOXEL (x, y, z, c);       " next voxel near line "
}
```

FIG. 9B $\Delta x = x_2 - x_1; \Delta y = y_2 - y_1; \Delta z = z_2 - z_1;$
$n = MAX(MAX(\Delta x, \Delta y, \Delta z), CEILING((\Delta x + \Delta y + \Delta z)/2));$
$x = x_1; \quad y = y_1; \quad z = z_1;$
$e_x = 2 * \Delta x - n;$      " error variable along $x$ "
$d1_x = 2 * \Delta x;$      " increment along $x$ for $e_x < 0$ "
$d2_x = 2 * (\Delta x - n);$      " increment along $x$ for $e_x \geq 0$ "

$e_y = 2 * \Delta y - n;$      " error variable along $y$ "
$d1_y = 2 * \Delta y;$      " increment along $y$ for $e_y < 0$ "
$d2_y = 2 * (\Delta y - n);$      " increment along $y$ for $e_y \geq 0$ "

$e_z = 2 * \Delta z - n;$      " error variable along $z$ "
$d1_z = 2 * \Delta z;$      " increment along $z$ for $e_z < 0$ "
$d2_z = 2 * (\Delta z - n);$      " increment along $z$ for $e_z \geq 0$ "

WRITE_VOXEL $(x, y, z, c);$      " first endpoint of line "

```
for (i = 1; i ≤ n; i++){                " follow the line "
    if(eₓ < e_y && eₓ < e_z){           " eₓ smallest, step in y and/or z "
        if(e_y < 0) e_y += d1_y;         " update e_y "
        else { e_y += d2_y; y++;}        " step in y "
        if(e_z < 0) e_z += d1_z;         " update e_z "
        else { e_z += d2_z; z++;}        " step in z "
        eₓ += d1ₓ;
    }
    else if(e_y < eₓ && e_y < e_z){     " e_y smallest, step in x and/or z "
        if(eₓ < 0) eₓ += d1ₓ;            " update eₓ "
        else { eₓ += d2ₓ; x++;}          " step in x "
        if(e_z < 0) e_z += d1_z;         " update e_z "
        else{ e_z += d2_z; z++;}         " step in z "
        e_y += d1_y;
    }
    else{                                " e_z smallest, step in x and/or y "
        if(eₓ < 0) eₓ += d1_z;)          " update eₓ "
        else{ eₓ += d2ₓ; x++;};          " step in x "
        if(e_y < 0) e_y += d1_y:         " update e_y "
        else { e_y += d2_y; y++;}        " step in y "
        e_z += d1_z;
    }
    WRITE_VOXEL (x, y, z, c);            " next voxel near line "
}
```

FIG. 9D $\Delta x = x_2 - x_1; \Delta y = y_2 - y_1; \Delta z = z_2 - z_1;$
$n = \Delta x + \Delta y + \Delta z;$
" Initialization for x, y, and z "
$x = x_1;$
$e_x = 2 * \Delta x - n;$      " error variable along x "
$d1_x = 2 * \Delta x;$      " increment along x for $e_x < 0$ "
$d2_x = 2 * (\Delta x - n);$      " increment along x for $e_x \geq 0$ "

$y = y_1;$
$e_y = 2 * \Delta y - n;$      " error variable along y "
$d1_y = 2 * \Delta y;$      " increment along y for $e_y < 0$ "
$d2_y = 2 * (\Delta y - n);$      " increment along y for $e_y \geq 0$ "

$z = z_1;$
$e_z = 2 * \Delta z - n;$      " error variable along z "
$d1_z = 2 * \Delta z;$      " increment along z for $e_z < 0$ "
$d2_z = 2 * (\Delta z - n);$      " increment along z for $e_z \geq 0$ "

WRITE_VOXEL (x, y, z, c);      " first endpoint of line "

for (i = 1; i ≤ n; i++)      " follow the line "
{
     if($e_x \geq e_y$ && $e_x \geq e_z$){      " $e_x$ is the largest "
         $e_x$ += $d2_x$;
         $e_y$ += $d1_y$;
         $e_z$ += $d1_z$;
         x++;      " step in x "
     }
     else if ($e_y \geq e_z$ && $e_y \geq e_z$){      " $e_y$ is the largest "
         $e_x$ += $d1_x$;
         $e_y$ += $d2_y$;      " update $e_y$, and "
         $e_z$ += $d1_z$;
         y++;      " step in y "
     }
     else{      " $e_z$ is the largest "
         $e_x$ += $d1_x$;
         $e_y$ += $d1_y$;
         $e_z$ += $d2_z$;      " update $e_z$, and "
         z++;      " step in z "
     }
     WRITE_VOXEL (x, y, z, c);      " next voxel near line "
}

FIG. 9E

```
i_w = Index of largest ABC(plane[i]) where i = 0,1,2;  i_u, i_v = Other indices;
u_0, u_f, v_0, v_f = Extremal values of vertices along i_u, i_v directions;
Δw_u = -α/γ;                           " u depth increment "
Δw_v = -β/γ;                           " v depth increment "
Δ = -2*α;                              " Decision increment "
w_0 = MAX(0,u_0)*Δw_u + MAX(0,v_0)*Δw_v — D/γ;              " Initial depth "
for each line l in edge_list {
    if(l.p1[i_v] > l.p2[i_v]) exchange l.p1 with l.p2;
    l.Δu = (l.p2[i_v] - l.p1[i_v])/(l.p2[i_u] - l.p1[i_u]);
    l.Δuw = Δw_u * l.Δu;
    l.u = l.p1[i_u];
}
Sort edge_list with ascending p1[i_v];
for (v = MAX(0,v_0); v ≤ MIN(m[i_v],v_f); v++){
    NEW_POS(i_v,v);
        for each line l in active_edge_list
            l.u += l.Δu;
    Resort active_edge_list;
    for each line l in edge_list having l.p1[i_v] == v
        Enter l into active_edge_list by insert sort;
    for each line l in active_edge_list having l.p2[i_v] ≥ v
        Delete l from active_edge_list;
    Set current and last line pointer to first and last in active_edge_list;
    if (u_0 < 0)                              " takes O(θ) "
        for each line l in active_edge_list having l.u < 0
            Toggle in flag, and advance current line pointer;
    NEW-POS(i_w, ROUND(w_0));
    dw = Δ;  in = off;
    for(u = MAX(0,FLOOR(current.u)); u ≤ MIN(m[i_u],last.u); u++){
        if(current.u < u)Toggle in flag, and advance current line pointer;
        if(in){ NEW_POS(i_u,u);        PUT_VOXEL();}
        if(dw > γ){ UPDATE_POS(i_w,1)     dw += Δ - 2*γ;}
        else if(dw < -γ){ UPDATE_POS(i_w,-1);    dw += Δ + 2*γ;}
        else dw += Δ;
    }
    w_0 += current.Δuw + Δw_v;
}
```

FIG. 10B

```
POLYHEDRON_FILL(polyh)
    polyhedron polyh;
{
x0,xf,y0,yf = Polyhedron bounds - extremal values of point along x, y directions;
for each polygon p in polyh{                    " Initialize polygons "
    p.active = new;
    if (p.plane[2] ≠ 0){
        p.Δwx = -plane[0]/plane[2];   p.Δwy = -plane[1] / plane[2];
    }
}
Sort edge_list with ascending p1[Y];
" Start looping on scan lines "
for ( y = y0; y ≤ yf ; y++){                    " Loop MY times "
    NEW_POS (Y, y);
    for each line l in active_edge_list
        l.u += l.Δu;
    Resort active_edge_list using bubble sort on u;    " takes O(θ) "
    for each line l in edge_list having l.p1[Y]== y{
        Calculate l.Δu by finding l's slope;
        Calculate l.u, the x value of l for the current y;
        l.Δuw = l.Δu * Δwx;
        Enter l into active_edge_list by insert sort on u;
    }                    " O(linecount*(num of new edges for each y)) "
    for each line l in active_edge_list having l.p2[Y] ≥ y    " takes O(θ) "
        Delete l from active_edge_list;
    Set current_edge and last_edge pointers to first and last in active_edge_list;
    for each polygon p in active_polygon_list
        if (p.yf ≥ y)       Delete p from active_ploygon_list;
        else                p.active = old;
    for (x = FLOOR(current_edge.u); x ≤ last_edge.u; x++){
        for each polygon p in active_polygon_list
            p.w += p.Δwx;
        Resort active_polygon_list using bubble sort on w;
        for each line l in active_edge_list having x - 1 ≤ l.u < x
            for each polygon p parent of l
                UPDATE_POLY(p,l);
        NEW_POS(X,x);
        DEPTH_FILL(active_polygon_list);
    }
}
}
```

FIG. 11B

```
UPDATE_POLY(p, l)
    polygon *p;   line *l;
{
    if(p.plane[2] ≠ 0){
        switch (p.active){
        case new:
            p.w = p.Δw_x *x + p.Δw_y *y - p.plane[3] / plane[2] + 0.5;
            Enter p into active_polygon_list by insert sort on w;
            p.active = in;          break;
        case old:
            p.w += l.Δuw + p.Δw_y;
            p.active = in;          break;
        case in:
            p.active = out;         break;
        case out:
            p.active = in;          break;
        }
    }
}
```

FIG. 11Bi

```
DEPTH_FILL(active_polygon_list)
    polygon *active_polygon_list;
{
    Set current_polygon pointer to first in polygon in active_polygon_list
    while(current_polygon ≠ null){   " Loop(length of list)/2 times "
        z1 = FLOOR(current_polygon.w);
        Advance current_polygon pointer to next in polygon;
        if(current_polygon == null)
            Singal algorithm error, polyhedron not closed;
        z2 = FLOOR(current_polygon.w);
        Advance current_polygon pointer to next in polygon;
        LOAD_MIN_VALUE ( z1 );
        LOAD_MAX_VALUE ( z2 );
        WRITE_RUN (Z);       " O(1) if multiple write hardware is availabe "
                             " else O(length of run) "
    }
}
```

FIG. 11Bii

*POLYHEDRON_FILL_* CLIPPING (polyh)
    polyhedron *polyh*;
{
" *Part I: Initialize polygons and edges for algorithm* "
$x_0, x_f, y_0, y_f$ = Polyhedron bounds—extremal values of points along x, y directions;
for each polygon *p* in *polyh* {
    polygon → *active* = 0;
    if *(polygon → plane[2] ≠ 0)*
        polygon → Δw = *plane[0]/plane[2]*;
}
Sort *edge_list* with ascending *p1[Y]*;

" *Part II: Start looping on scan lines* "
for *(y = MAX(0,y₀); y ≤ MIN(y_f, MAX_CFB[Y]; y++)*{      " *Loop MY times* "
    *NEW_POS(Y,y)*;
    for each line *l* in *active_edge_list*
        *l → u += l → Δu*;
    Resort *active_edge_list* using bubble sort;      " *takes O(θ)* "
    for each line *l* in *edge_list* having *l → p1[Y] == y* {
        Calculate *l → Δu* by finding *l*s slope;
        Calculate *l → u*, the *x* value of *l* for the current *y*;
        Enter *l* into *active_edge_list* by insert sort;
    }      " *O(linecount∗(num of new edges for each y))* "
    for each line *l* in *active_edge_list* having *l → p2[Y] ≥ y*    " *takes O(θ)* "
        Delete *l* from *active_edge_list*;
    Set *current_edge* pointer to first in *active_edge_list*;
    if *(x₀ < 0)*{
        for each line *l* in *active_edge_list* having *l.u < 0*
            for each polygon *p* parent of *l*
                *UPDATE_POLY(p)*;
        Advance *current_edge* pointer;
    }      " *Takes O(η), worst cast* "
    Sort *active_polygon_list* by *w* values;      " *O(l∗log(l))* "
    Delete non-active polygons from *active_polygon_list*;
}

(Fig.11c continue on next page)

FIG. 11C (Continue from previous page)

```
for (x = MAX(0,x₀); x ≤ MIN(xf, MAX_CFB[X]); x++){
    for each polygon p in active_polygon_list{
        p → w += p.Δw ;
    Resort active_polygon_list using bubble sort;
    for each line l in active_edge_list having l.u < x {
        for each polygon p parent of l
            UPDATE_POLY(p);
        Advance current_edge pointer;

}                           " Takes O(η)(very worst case) "
    Delete non-active polygons from active_polygon_list
                            " O(length active-polygon-list) "
    NEW_POS(X,x);

" Modified DEPTH_FILL(Figure 4.44)with scissoring: "
Set current_polygon pointer to start of active_polygon_list;
while(current_polygon ≠ null){       " Loop(len of list)/2 times "
    z1 = MAX(0, current-polygon → w);
    Advance current_polygon pointer;
    if (current_polygon == null)
        Signal algorithm error, polyhedron not closed;
    z2 = MIN(MAX_CFB[Z], current_polygon → w);
    Advance current_polygon pointer;
    if (z1 > MAX_CFB[Z])
        break:                    " Exit loop "
    LOAD_MIN_VALUE(z1);
    LOAD_MAX_VALUE(z2);
    WRITE_RUN(Z);
    }
  }
}
```

FIG. 11C

METHOD OF CONVERTING CONTINUOUS THREE-DIMENSIONAL GEOMETRICAL REPRESENTATIONS OF POLYGONAL OBJECTS INTO DISCRETE THREE-DIMENSIONAL VOXEL-BASED REPRESENTATIONS THEREOF WITHIN A THREE-DIMENSIONAL VOXEL-BASED SYSTEM

BACKGROUND OF THE INVENTION

The present invention relates generally to methods of converting continuous three-dimensional geometrical representations into discrete three-dimensional representations, and more particularly relates to methods of converting continuous three-dimensional geometrical representations of polygonal objects into discrete three-dimensional voxel-based representations thereof within a three-dimensional voxel-based system.

SETTING FOR THE INVENTION

Three-dimensional (hereinafter "3-D") computer graphic systems based upon voxel (i.e., volume element) representation of 3-D objects in a large 3-D memory, are known and have been described, for example, in the following publications:

"A 3-D Cellular Frame Buffer," Arie Kaufman and R. Bakalash, in *Proc. EUROGRAPHICS '85*, Nice, France, September 1985, pp. b 215–220;

"Memory Organization for a Cubic Frame Buffer," Arie Kaufman, in *Proc. EUROGRAPHICS '86*, Lisbon, Portugal, August 1986, pp. 93–100;

"Towards a 3-D Graphics Workstation," Arie Kaufman, in *Advances in Graphics Hardware I*, W. Strasser (Ed.), Springer-Verlag, 1987, pp. 17–26;

"Voxel-Based Architectures for Three-Dimensional Graphics," Arie Kaufman, in *Proc. IFIP '86, 10th World Computer Congress*, Dublin, Ireland, Sept. 1986, pp. 361–366;

"CUBE—An Architecture Based on a 3-D Voxel Map," Arie Kaufman and R. Bakalash, to appear in *Theoretical Foundations of Computer Graphics and CAD*, R. A. Earnshaw (Ed.), Springer-Verlag, 1988, pp. 689–701;

"Parallel Processing for 3D Voxel-Based Graphics," Arie Kaufman and R. Bakalash, to appear in *Parallel Processing for Computer Vision and Display*, P. M. Dew, R. A. Earnshaw, and T. R. Heywood (Eds.), Addison-Wesley, 1988;

"Memory and Processing Architecture for 3-D Voxel-Based Imagery," Arie Kaufman and R. Bakalash, in *IEEE Computer Graphics and Applications*, 1988; and "The CUBE Three-Dimensional Workstation," Arie Kaufman, in *Proc. NCGA '88: Ninth Annual Conference and Exposition*, Anaheim, Calif., March 1988, pp. 344–354.

As disclosed in the above publications and generally illustrated in FIGS. 1 and 2, the 3-D computer graphic workstation 1 is based upon 3-D voxel-based representation of objects within a large 3-D memory 2 referred to hereinafter as a 3-D Cubic Frame Buffer, which comprises specially organized memory modules (not shown) containing a cellular array of unit cubic cells called voxels. The workstation 1 is a multiprocessor system with three processors accessing the Cubic Frame Buffer 2 to input, manipulate, and view and render the 3-D voxel images.

In general, the processors include a 3-D Frame Buffer Processor 3, a 3-D Geometry Processor 4, and a 3-D Viewing Processor 5. The 3-D Frame Buffer Processor 3 acts as a channel for 3-D voxel-based images which have been "scanned" using a 3-D scanner 6 such as CAT and MRI medical scanners The 3-D scanned voxel-based images are the primary source of Cubic Frame Buffer data. Once the voxel images are stored in the Cubic Frame Buffer 2, they can be manipulated and transformed by the 3-D Frame Buffer Processor 3, which also acts as a monitor for 3-D interaction.

The 3-D Geometry Processor 4 samples and thereafter converts or maps 3-D continuous geometric representations of a 3-D object, into their 3-D discrete voxel representation within the Cubic Frame Buffer 2. Notably, the 3-D continuous geometric representations comprise a set of mathematical functions which as a whole serve as a 3-D model of the 3-D object. Together, this sampling and conversion (i.e. mapping) process is typically referred to as a "scan-conversion" process.

The 3-D Viewing Processor 5 examines the voxels in the Cubic Frame Buffer 2 in a specified view direction which can be one of a variety of directions. By taking into consideration depth, translucency, and color values, the 3-D Viewing Processor 5 generates a 2-D shaded projection (i.e., video pixel image) of the cubic frame voxel-based image, inputs the same into a conventional 2-D frame buffer 7 which in turn is scanned by a conventional video processor 8, thereby updating a video screen 9 with the 2-D shaded pixel image.

Referring to FIG. 3, in particular, a general overview of 2-D and 3-D scan-conversion processes is given in terms of (i) mapping from continuous 3-D geometric models to 2-D discrete pixel-image space, and (ii) mapping from continuous 3-D geometric models to 3-D discrete voxel-image space, respectively. In the above-described 3-D voxel-based graphics system, the 2-D scan-conversion process illustrated in FIG. 3 is not carried out, as such prior art processes are strictly limited to 2-D image data-base generation and 2-D pixel-image modelling, whereas in contrast, the 3-D scan-conversion process provides robust 3-D image data-base generation and 3-D voxel-image modelling.

In order to obtain in real-time 2-D images projections of 3-D voxel images, a special common bus referred to as a Voxel-Multiple-Write-Bus (not shown) can be provided which simultaneously processes a full beam of voxels along a specified viewing direction and selects the first opaque voxel along the beam in a time which is proportional to the log of length of the beam of voxels. Also, in order to assist the special common bus in real-time viewing and to support real-time "3-D scan conversion" of continuous 3-D geometrical models into 3-D discrete voxel images, and manipulation of 3-D voxel-based images stored in the Cubic Frame Buffer, a special skewed 3-D memory organization can be provided which enables parallel retrieval and storage of whole beams of voxels. In addition to the unique memory organization of the Cubic Frame Buffer, a special addressing mechanism can be provided as well which works in connection with the special common bus and the 3-D skewed memory organization. Each of the above-mentioned system features are more fully described in the above-referenced publications.

The workstation described in the above publications provides a full range of inherent 3-D interactive operations in a simple yet general workbench set-up, since the workstation operates in both discrete 3-D voxel space and 3-D geometry space, and provides ways in which to interact the two spaces. Accordingly, the workstation can be used with inherent 3-D interaction devices, techniques and electronic tools, which support direct and natural interaction, generation, and editing of 3-D continuous geometrical models, 3-D discrete voxel images, and their transformations. Such a 3-D voxel-based graphics workstation is appropriate for many 3-D applications such as medical imaging, 3-D computer-aided design, 3-D animation and simulation (e.g. flight simulation), 3-D image processing and pattern recognition, quantitative microscopy, and general 3-D graphics interaction.

Thus, when using a 3-D voxel-based graphic system of the type described above and elsewhere in the literature, there arises the need for computationally efficient methods which convert 3-D continuous geometrical models of objects into 3-D discrete voxel-based representations, which can be, for example, stored in the 3-D Cubic Frame Buffer memory 2 of the voxel-based graphic system 1. Such computational processes are often referred to as methods of scan converting of 3-D objects, and are carried out in the 3-D Geometry Processor of the workstation described above. Scan conversion methods generate discrete voxel representations of 3-D objects, and provide computationally efficient ways in which to write voxel representations for such objects into the Cubic Frame Buffer of the workstation.

Typically, there are two principal approaches to writing into the Cubic Frame Buffer 2, 3-D discrete voxel representations of 3-D objects. In the case where a person desires to model in a voxel-based graphic system a real 3-D object (e.g. a teapot), 3-D digitizers (i.e. coordinate measuring devices) such as the 3Space Isotrack Stylus device can be used to measure and convert into the Cubic Frame Buffer, the coordinates of the real 3-D object, i.e., teapot. While this method is appropriate, it is often time-consuming and it ceases to be effective for large objects, e.g. an airplane, or objects in the design stage which do not yet exist.

An alternate approach to modeling 3-D objects involves using mathematical representations of various sorts to model the various elements of the objects, and subsequently to convert such 3-D continuous mathematical representations into 3-D discrete voxel representations which are to be stored in the 3-D Cubic Frame Buffer of the workstation. The types of mathematical representations presently available to model 3-D objects, either real or synthetic, include: 3-D lines, polygons (optionally filled), polyhedra (optionally filled), cubic parametric curves, bi-cubic parametric surface patches, circles (optionally filled) and quadratic objects (optionally filled) like those used in constructive solid geometry, such as cylinders, cones and spheres. Notably, the advantage of using 3-D continuous mathematical representations for modelling 3-D objects is that the objects can be either real, or synthetic, i.e., having an existence only within the 3-D voxel-based computer graphics system itself.

It is appropriate at this juncture to discuss in general the nature of the 3-D scan-conversion process, and also the construction of 3-D voxel-based images of scan-converted 3-D continuous geometrical models of 3-D objects.

Referring to FIGS. 3 and 4 in particular, the scan-conversion process is illustrated as a mapping of a 3-D geometrically-represented object in a continuous 3-D space, into a tesselated voxel-cellular model in discrete 3-D voxel-image space. Notably, most of the 3-D discrete topology terms used herein are generalizations of those used in 2-D discrete topology. Thus, referring to FIGS. 3 and 4, the continuous 3-D space $(R \times R \times R)$ is designated as "$R^3$ space", while the discrete 3-D voxel-image space $(Z \times Z \times Z)$, which is a 3-D array of grid points is hereinafter referred to as "$Z^3$ space". A voxel, or the region contained by a 3-D discrete point (x, y, z) shall be termed the continuous region (u, v, w) such that $$x - 0.5 < u \leq x + 0.5,$$

$$y - 0.5 < v \leq y + 0.5, \text{ and}$$

$$z - 0.5 < w \leq z + 0.5.$$

This condition assumes that the voxel "occupies" a unit cube centered at the grid point (x, y, z) and the array of voxels tesselates $Z^3$. Although there is a slight difference between a grid point and a voxel, they will be used interchangeably hereinafter.

As a child has a degree of flexibility regarding how he or she is to stack building blocks to construct a particular model of some object, the computer graphic designer using a voxel-based system as discussed above, similarly has a degree of flexibility in his or her voxel construction techniques. Thus, as a child learns that certain stacking arrangements of building blocks (for example, cubic building blocks) have structural and connectivity advantages over alternative stacking arrangements, so too does the computer graphics designer realize that certain voxel connections or stacking arrangements may be preferred over others under particular circumstances.

How contiguous or neighboring voxels are connected or arranged with respect to one another, is a very important concept in voxel-representation in general, and in 3-D scan-conversion processes, in particular. This concept of how neighboring voxels are connected, is referred to as "connectivity" and is important enough to merit further discussion hereinbelow.

Referring to FIGS. 5A through 5C and 6A through 6C, the three types of possible voxel connections among neighboring voxels ar illustrated. Much like an apartment dweller has different types of neighbors situated in front, in back, along his sides and below him, each voxel (x, y, z) in discrete 3-D voxel-image space $Z^3$ (in the Cubic Frame Buffer), can have three kinds of neighbors as well. These three types of neighboring voxels are defined below by the following definitions:

(1) A voxel can have 6 direct neighbors at positions: (x+1, y, z), (x−1, y, z), (x, y+1, z), (x, y−1, z), (x, y, z+1), and (x, y, z−1).

(2) A voxel has 12 indirect neighbors at positions: (x+1, y+1, z), (x−1, y+1, z), (x+1, y−1, z), (x−1, y−1, z), (x+1, y, z+1), (x−1, y, z+1), (x+1, y, z−1), (x−1, y, z−1), (x, y+1, z+1), (x, y−1, z+1), (x, y+1, z−1), and (x, y−1, z−1).

(3) A voxel has 8 remote neighbors at positions: (x+1, y+1, z+1), (x+1, y+1, z−1), (x+1, y−1, z+1), (x+1, y−1, z−1), (x−1, y+1, z+1), (x−1, y+1, z−1), (x−1, y−1, z+1), and (x−1, y−1, z−1).

Alternatively, the three kinds of neighboring voxels defined above, can be specified in terms whether a voxel shares a face, a side (i.e. edge) or a corner with a neighboring voxel, as illustrated in FIGS. 5A, 5B, and 5C, respectively. In discrete 3-D voxel image space $Z^3$, the 6 direct neighbors are defined as 6-connected neighbors and are graphically illustrated in FIG. 6A. Both the 6 direct and 12 indirect neighbors are defined as 18-connected neighbors and are graphically illustrated in FIG. 6B. All three kinds of neighbors are defined as 26-connected neighbors and are illustrated in FIG. 6C.

Referring now to FIGS. 7A, 7B and 7C, in particular, the three principal types of paths of connected voxels in $Z^3$ space, are graphically illustrated. In FIG. 7A, a 6-connected path is defined as a sequence of voxels such that consecutive pairs are 6-neighbors. In FIG. 7B, an 18-connected path is defined as a sequence of 18-neighbor voxels, while as shown in FIG. 7C, a 26-connected path is defined as a sequence of 26-neighbor voxels. From the above-defined and described voxel path connections and arrangements, any type of discrete 3-D voxel-based model can be constructed in $Z^3$ space of the 3-D Cubic Frame Buffer 2. For example, FIGS. 8A and 8B provide two views of a three-dimensional teapot modelled in discrete 3-D voxel-image space $Z^3$. The discrete 3-D voxel-image is created by connecting cubic voxels according to "26-connectivity" as described hereinabove. Notably, FIG. 8B provides a 2-D side cross-sectional view of the 3-D voxel representation of the teapot shown in FIG. 8A, and illustrates the "26-connectivity" nature of the 3-D voxel-based image of 8A. When closely examined, FIG. 8B illustrates the face-to-face and side-to-side (i.e. edge-to-edge) and even corner-to-corner connections of neighboring voxels.

In summary, "connectivity" relates to how unit voxels are connected together to synthesize voxel-based image representations of continuous 3-D geometrical models. Also, the type of connectivity employed specifies the number of "options" that are available when stepping in the coordinate directions of discrete 3-D voxel space during 3-D scan-conversion processes.

Turning now to other 2-D geometrical objects of interest in $R^3$ space, namely parametric surfaces, polygons and hollowed polyhedra, another elementary concept arises concerning the nature of the connectivity of the resultant filled 3-D objects which are represented as a set of voxels with a 3-D Cubic Frame Buffer, in particular. The concept is defined as "tunnels" and concerns "thickness" of voxel-represented surface, and how easily it is penetratable using, for example voxel-based beams or rays. There are three principal types of tunnels which are defined below. A 6-connected tunnel is a path of 6-connected transparent voxels through a surface. Such tunnels are actual holes in the voxel-based surface. Similarly, an 18-connected tunnel is defined as a path of 18-connected transparent voxels through the voxel-based surface. Surfaces with tunnels of this kind are "thicker" than those surfaces lacking 6-connected tunnels. Even "thicker" voxel-based surfaces can be formed by avoiding the formation of 26-connected tunnels which are paths of 26-connected transparent voxels through the surface.

In addition to connectivity requirements, 3-D scan-conversion processes are also required to satisfy fidelity and efficiency requirements. All three of these requirements are met by the 3-D scan-conversion methods of the present invention disclosed hereinafter. The basic fidelity requirements in scan-converting an object from $R^3$ to $Z^3$ space, are that:

(1) The discrete points from which the region contained by them is entirely inside the continuous object, are in the scan-converted discrete object.

(2) The discrete points from which the region contained by them is entirely outside the continuous object, are not in the scan-converted discrete object.

Obviously, some discrete points will not belong to either of the above cases and more guidelines are necessary. Those are:

(3) If the object is a curve (i.e. 1-D object), then the converted object will need certain connectivity requirements. In this case, the converted end point will be in the converted object.

(4) If the object is a surface (i.e. 2-D object), then it must meet certain "lack of tunnels" connectivity requirements. In this case, the converted curved "edges" will be converted object.

(5) If the object is volume (i.e. 3-D object), then its "inside" will be converted according to requirement (1) above. Other points will be treated by a majority decision, i.e. the discrete point is decided in the object if more than half its region is in the continuous object.

For curves, 6-connectivity, 18-connectivity or 26-connectivity can be selected, depending on implementation needs or modelling requirements.

Regarding connectivity for surfaces and volumes, the following conditions are required. For surfaces, 6-connected tunnels, 18-connected tunnels or 26-connected tunnels are disallowed depending on implementation needs or modelling requirements. For solid volumes, 6-connectivity is usually required to avoid any internal cavities.

It is appropriate at this juncture to discuss the importance of the scan-conversion method capable of generating voxel-based polygons, for example, which lack 18- and 26-connected tunnels, rather than merely lacking 6-connected tunnels. In particular, when 3-D scan-conversion methods are used to project rays of voxels into the dimensional expanse of discrete 3-D voxel space $Z^3$, in order to simulate natural processes such as the reflection of light off surfaces and reflecting back into an observer's eye from a particular perspective, it is very important that the voxel-based reflective surface, be capable of reflecting a ray of voxels casted onto a surface. However, if the voxel-based polygon surface lacks 18-connected tunnels, it is possible for the casted ray of voxels to pass through the polygon and not reflect back to an observer's eye. This can pose serious problems in simulation of natural processes of vision for example. However, when using voxel-based polygons lacking 18- or 26-connected tunnels, the chance of a casted ray of voxels not reflecting back is greatly lessened. Therefore, there is an advantage of forming voxel-based polygons which lack 18-and/or 26-connected tunnels, rather than merely lacking 6-connected tunnels.

Having discussed the conventional terminology and basic requirements of scan conversion methods, it is now appropriate to turn to and discuss 3-D scan-conversion methods known in the prior art, and point out with particularity their shortcomings and drawbacks.

Conventional 3-D scan-conversion methods for voxel-based graphics systems are described in the paper "3D Scan-Conversion Algorithms for Voxel-Based Graphics," by Arie Kaufman and Eyal Shimony, published on pp. 45-76, in *Proc. 1986 ACM Workshop on Interactive 3D Graphics*, held in Chapel-Hill, N.C., on October 1986. In this publication, several different types of methods for scan-converting 3-D continuous geometric objects (i.e., representations), are described. The 3-D geometric objects discussed therein include 3-D lines, polygons (optionally filled), polyhedra (optionally filled), cubic parametric curves, bi-cubic parametric surface patches, circles (optionally filled), and quadratic objects (optionally filled) like those used in constructive solid geometry, i.e. cylinders, cones and spheres.

In general, prior art scan-conversion methods disclosed in "3D Scan-Conversion Algorithms for Voxel-Based Graphics", are (i) incremental in nature, (ii) perform scan-conversion with computational complexity which is in linear proportion to the number of voxels written into the Cubic Frame Buffer, and (iii) use only additions, subtractions, tests and simpler operations inside the inner computational process loops. In general, all of the prior art methods are characterized by nonsymmetric computational processes within the inside loops, thereby requiring stepping only along the designated coordinate direction and thus place severe constraints on the type of connections and connectivity that can be formed in any particular voxel-image arrangement. In addition, there are numerous other shortcomings and drawbacks as to make such processes less than desirable in many applications, as will be described below.

In the publication "3D Scan-Conversion Algorithms for Voxel-Based Graphics," a method for scan-converting 3-D straight lines is disclosed. This method converts 3-D line segments into a discrete set of voxels having 26-connectivity in discrete 3-D voxel-image space, $Z^3$. While the method uses only integer arithmetic and only addition, subtraction, shifting and testing operations, the decision loop for x, y and z coordinate directions is non-symmetric and thus only 26-connected lines in 3-D voxel space can be generated. Thus while the x, y and z coordinates for each voxel can be computed incrementally, this non-symmetric method is incapable of drawing 6- and 18-connected type lines in 3-D discrete voxel-space $Z^3$.

The above-referenced paper "3D Scan-Conversion Algorithms for Voxel-Based Graphics" discloses a method of scan-converting continuous 3-D polygons (e.g. polygon mesh) into voxel-based surfaces lacking 6-connected tunnels in discrete 3-D voxel-image space $Z^3$. Therein, a 3-D planar polygon is defined by a list of n lines representing a closed sequence of "edges" (i.e. line segments), the plane equation on which the polygon resides, and the flag to fill in its interior, if it is not hollowed.

This prior art method for scan-converting 3-D planar polygons suffers from numerous shortcomings and drawbacks. In particular, the method requires the use of floating-point arithmetic, numerical rounding (e.g. truncation), operations in the computational loops, and is strictly a computational-based process which is quite slow and computationally inefficient. Also, while this scan-conversion method is incremental in nature, the method requires a different computational process for scan-converting a 3-D planar polygon having a particular orientation with respect to one of the principal planes of the reference coordinate system. Thus, the method requires three different computational processes in order to scan-convert 3-D planar polygons of arbitrary orientation in continuous 3-D geometric space $R^3$. This requirement has the effect of making the method both slow and computationally inefficient. Furthermore, this method is incapable of scan-converting 3-D planar polygons, the dimensions of which in $R^3$ space extend beyond the representational range of the discrete 3-D voxel space $Z^3$ of the system. Also, the method is limited to generating voxel-based representations which are limited to only lacking 6-connected tunnels.

The paper "3D Scan-Conversion Algorithms for Voxel-Based Graphics" also discloses a method for scan-converting continuous 3-D polyhedra, into voxel-based objects, in discrete 3-D voxel-image space $Z^3$. The surface (or envelope) of such polyhedra are limited to lacking 6-connected tunnels. The polyhedra includes cubes, pyramids, parallelpipeds and pentagonal volumes, representing both surfaces (i.e. envelopes) and solid representations thereof. Therein, the polyhedron is defined by a list of planar polygons representing a polygon mesh envelope (i.e. surface) which completely encloses some volume. According to this method, the boundary of the polyhedron is scan-converted using the above-described prior art method of scan-converting polygons.

This prior art method for scan-converting 3-D polyhedra suffers from significant shortcomings and drawbacks as well. In particular, the method requires floating-point arithmetic, numerical rounding operations, and is a strictly computational-based process, which is quite slow and computationally inefficient. Also, while being incremental in nature, the method is non-symmetrical in nature, requires a different computational process in order to scan-convert a 3-D planar polygon comprising 3-D polyhedra, and having a particular orientation in continuous 3-D geometrical object space $R^3$. Thus, as with the prior art method for scan-converting 3-D polygons, this method also requires three computational processes in order to be capable of scan-converting 3-D polyhedra arbitrarily oriented in 3-D geometrical space $R^3$. Consequently, the method is very slow and computationally inefficient. Furthermore, the method is incapable of scan-converting 3-D polyhedra the dimension of which extend beyond the range of the discrete 3-D voxel space $Z^3$.

In view, therefore, of prior art scan-conversion methodologies for 3-D polygonal objects, there is a great need for scan-conversion methods which avoid the use of floating-point arithmetic, numerical rounding or truncation operations, and "brute-force" type computational processes for determining the voxel coordinates in the x, y and z directions. In addition to scan-conversion methods which are fast, computationally efficient, and lend themselves to simplified hardware and software implementation, there is also a great need for 3-D scan-conversion methods which generate voxel-based representations with a wide variety of voxel connectivities and lack of tunnels, and which are capable of scan-conversion of polygonal objects, the dimensional extent of which in continuous 3-D geometrical space can exceed any dimensional extent of the discrete 3-D voxel space in which the scan-conversion process is carried out.

Accordingly, it is a principal object of the present invention to provide a method of converting continuous 3-D geometrical representations, into discrete 3-D voxel-based representations in discrete 3-D voxel-image space. In particular, the method is most suitable for use with a 3-D Cubic Frame Buffer memory of a 3-D voxel-based graphics system. However, the method can be used in numerous other environments and applications including beam-casting, ray-tracing, flooding, Z-buffer processes in pixel-image space, and other operations known in the art.

It is a further object to provide a method of converting continuous 3-D geometrical representations of 3-D polygonal objects into discrete 3-D voxel-based representations, wherein the method has decisional process loops of a symmetric nature with respect to the principal planes of the coordinate reference system. As a result of the symmetry between the decisional process loops for x-y, y-z and x-z plane directions, one high-speed hardware realization can be used to implement the scan-conversion methods hereof.

Another object of the present invention is to provide a method of converting continuous 3-D geometrical representations into discrete 3-D voxel-based representations having a wide variety of voxel connectivities and lack of tunnels.

A further object of the present invention is to provide methods of converting continuous 3-D geometrical representations into discrete 3-D voxel-based representations, wherein the method is incremental in nature, uses all integer arithmetic (i.e. math), thereby eliminating the requirement of numerical rounding or truncation operations. The method determines the x, y and z coordinates of voxels using very simple comparisons, updating, and/or coordinate stepping (i.e. increment, decrement, or no change) operations. Notably, the scan-conversion method of the present invention is principally a decision-based process rather than a computational-based process. Thus, the mathematical operations carried out in the inner decision process loops are reduced to only additions, subtractions, tests and simpler operations in contrast with brute force computational measures characteristic of prior art computational scan-conversion processes.

It is a further object of the present invention to provide a method of scan-conversion that performs scan-conversion with computational complexity which is linear and in some special cases even less than linear (e.g. filled polyhedra), with respect to the number of voxels written in the Cubic Frame Buffer of a 3-D voxel-based system.

It is an even further object of the present invention to provide a method of converting a continuous 3-D straight-line segment into a discrete set of n voxels connected together for storage in a 3-D Cubic Frame Buffer memory of a voxel-based computer graphic system.

A further object of the present invention is to provide a method of converting a continuous 3-D geometrical representation of a planar polygon in any orientation, into a discrete set of voxels connected together in discrete 3-D voxel-image space, with a variety of connectivity (i.e. lack of tunnels) types.

A further object of the present invention is to provide a method of converting a continuous 3-D geometrical representation of a polyhedron (such as a cube, pyramid, parrallelpiped, or pentagonal object), into a discrete set of voxels connected together in discrete 3-D voxel-image space, where the set of voxels lacks internal cavities.

An even further object of the present invention is to provide a method of converting continuous 3-D geometrical representations of 3-D polygonal objects, into a discrete set of voxels connected together in discrete 3-D voxel space, where the dimensional extent of the polygonal object in continuous 3-D geometrical space exceeds dimensional extent of the discrete 3-D voxel space. Notably, this "clipping" capability of the method of the present invention, eliminates altogether the computational inefficiencies of prior art scan-conversion methods which scan-convert clipped polygonal objects, and thereafter employ wasteful "scissoring" operations.

These and other objects of the present invention will be explained hereinafter, and will be more particularly delineated in the appended claims, and other objects of the present invention will hereinafter be apparent to one with ordinary skill in the art to which the present invention pertains.

SUMMARY OF THE INVENTION

In general, the present invention concerns a method of converting a continuous 3-D geometrical representation of polygonal objects in continuous 3-D geometrical space, into a discrete set of voxels representing the polygonal objects in discrete 3-D voxel space. The polygonal object is characterized by geometrical parameters, and the discrete 3-D voxel space is characterized by coordinate directions, where the addresses of the discrete 3-D voxel space are specified by the integer coordinate values of the voxels. In general, the method comprises transforming the geometrical parameters of the polygonal object, into integer-based geometrical parameters. The coordinate values of each voxel are then determined by stepping along the coordinate directions in the discrete 3-D voxel space and using at least one decisional logic process for the coordinate directions. The determination of the coordinate values are based upon the integer-based geometrical parameters.

In the preferred embodiment, the polygonal object comprises a 3-D polygon, and the method further comprises prior to transformation, defining a generalized coordinate system in which the polygon is represented in substantially the same form for any orientation of the polygon in the continuous 3-D geometric space. The generalized coordinate system is expressed in terms of orthogonal coordinate directions u, v and w which form three principal planes u-v, u-w and v-w. In the generalized coordinate system, the polygon has a projection of greatest area on the u-v plane and has a coordinate direction extent of smallest value along the w coordinate direction.

In another embodiment, the method comprises determining the coordinate values of each voxel, by stepping along the coordinate directions in discrete 3-D space and using two decisional logic processes for the two coordinate directions. The coordinate value determination is based upon the integer-based geometrical parameters.

In the preferred embodiment, the method is capable of scan-converting a polygonal object which has a dimensional extent in the continuous 3-D geometrical space $R^3$ which exceeds a dimensional extent of the discrete 3-D voxel space $Z^3$. Such an embodiment is carried out by determining the coordinate values of each voxel, by stepping along the coordinate directions in discrete 3-D voxel space, where at least one of the coordinate directions is bounded by the dimensional extents of the discrete 3-D voxel space, and using at least one decisional logic process for the coordinate directions. In addition, discrete 3-D voxel space is characterized by coordinate directions, where the addresses of the discrete 3-D voxel space are specified by the integer coordinate values of the voxels.

Using the method of scan-conversion of the present invention, voxel-based representations lacking 6-connected tunnels, 18-connected tunnels or 26-connected tunnels, can be generated.

In one embodiment of the present invention, a method is provided for converting a continuous 3-D geometrical representation of a polygon into a discrete set of connected voxels, representing the 3-D polygon in 3-D discrete space of a voxel-based system. The 3-D polygon is defined by an edge list representing a closed sequence of edges referred to as an edge list. The edge list includes edges which are 3-D straight line segments defined by first and second endpoints, forming the vertices of the polygon. The vertices of the 3-D polygon specify a plane equation thereof. The discrete 3-D voxel space is characterized by orthogonal x, y and z coordinate directions, where the addresses of the discrete 3-D space are specified by integer x, y and z coordinate values of the voxels.

The method of scan-conversion involves specifying a generalized coordinate system having orthogonal coordinate directions u, v and w which form three principal planes u-v, u-w and v-w. The 3-D discrete voxel space is characterized by the u, v and w coordinate directions, and the addresses of the discrete 3-D space are specified by integers u, v and w coordinate values of the voxels. The u, v and w coordinate directions correspond to the x, y and z coordinate directions in such a way that the polygon has a projection of the greatest area on the u-v plane and has a coordinate direction extent of smallest value along the w coordinate direction. The proximate plane equation is specified by plane equation coefficients corresponding to generalized coordinate directions u, v and w, and the coordinate direction w is defined as the depth direction of the polygon in the generalized coordinate direction. From the vertices, the minimum and maximum values of the u, v and w coordinate directions are determined. On the basis of the plane equation coefficients, the method involves defining an integer decision variable for the w coordinate direction, the first and second integer decision thresholds, integer decision variable increments and integer depth increments along each of the u and v coordinate directions. For the vertex having the minimum value for the v coordinate direction, the initial value for the coordinate direction value w is determined.

Thereafter, for each edge in the edge list, the following parameters are determined: the slope of the edge in the u-v plane, based on the first and second endpoints of the edge; and the depth increment along the edge, based upon the u-v slope and the integer depth increment along the u coordinate direction. The edge list is then ordered by ascending value of the v coordinate direction of the first endpoint. Subsequently, the continuous 3-D polygon is converted into a discrete set of voxels, by stepping along the coordinate directions u and v and using decisional process logic for determining the integer value of the coordinate direction w. The conversion is based upon the edge list, the slopes of the edges in the u-v plane, the depth increment along the edges, the integer decision variable, the first and second integer decision thresholds, and integer depth increments along each of the u and v coordinate directions.

In the preferred embodiment, the step of converting the continuous 3-D polygon is carried out by the following procedure. For each integer value of v between the minimum and maximum values thereof which specify the v-th scan-line parallel to the generalized coordinate direction u, the following sequence of steps are performed in a loop fashion. A determination is made of the coordinate values in the coordinate direction which corresponds to the endpoints of the voxel runs along the v-th scan-line, which are contained within the polygon. Thereafter, for each voxel in the voxel run, the integer value of the coordinate direction w, is determined.

In the preferred embodiment, the method involves determining the coordinate values of the u-th coordinate direction which correspond to the endpoints of voxel runs along the v-th scan-line contained within the polygon, as follows. An active edge list is formed from the edge list. Notably, the active edge list is a subset of the edge list in which the edges intersect with the v-th scan-line, and the active list is ordered by ascending coordinate direction value u. Each edge list also has a first and last edge. Next, for each edge in the edge list, the method involves stepping along the edge according to the slope of the edge determined hereinabove, and then reordering the active edge list. For each edge in the edge list in which the v-th coordinate of the first endpoint equals the coordinate value v, the edge is inserted into the active edge list so as to preserve the order of the edges in the active edge list. Also, for each edge in the active edge list in which the v-th coordinate of the second endpoint equals the coordinate value v, the edge is deleted from the active edge list.

In one embodiment, the method determines, for each voxel in the voxel run, the integer value of the coordinate direction w by the following procedure. An initial value is set for the integer coordinate direction value w on the first edge of the active edge list. Thereafter, for each coordinate direction value u in the range between the u coordinate values of the first and last edges in the active edge list, the following four steps are undertaken. A voxel is placed in the discrete 3-D voxel space at the coordinate values u, v and w, if the coordinate direction value u is determined to be inside the polygon. For each voxel in the range, the integer coordinate value in the w coordinate direction is determined. This determination is based upon the integer decision variable, first and second integer decision thresholds, and the integer depth increments. The integer decision variable is then updated using the integer decision variable increments. Also, the initial value for the coordinate direction value u on the first edge of the active edge list, is updated as well. This updating step is based upon the integer depth increment along the coordinate direction v, and the depth increment along the first edge.

In another preferred embodiment, the method of the present invention involves determining the integer value of the coordinate direction w for each voxel in the voxel run, by the following decisional process. Prior to scan-conversion of the continuous 3-D polygon, the method comprises carrying out, for each edge in the edge list, the following steps. An integer initial depth decision variable, integer initial depth thresholds, integer initial depth decision variable increments, and integer initial depth increments, are defined. Thereafter, the integer initial depth thresholds, the integer initial depth decision variable increments and the integer initial depth increments are determined on the basis of the integer depth increments and the first and second endpoints of the edge.

For each integer value v between the first and last values thereof which specify a v-th scan-line which is parallel to the generalized coordinate direction u, the following sequence of steps is performed in a loop fashion as follows. A determination is made of the coordinate values of the u coordinate direction which corresponds to the endpoints of voxel runs along the v-th scan-line contained within the polygon. For each coordinate direction value u in the range between the u coordinate values of the first and last edges in the active edge list, the integer value of the coordinate direction w is determined for each voxel in the range. On the basis of the integer initial depth decision variable, the integer initial depth threshold, and the integer initial depth increments, the method determines the integer initial value for the coordinate direction value w on the first edge of the active edge list. Then, the integer initial depth decision variable is updated using the integer initial depth decision variable increments.

Another aspect of the present invention is a method of scan-converting 3-D polygonal objects into a discrete set of voxels having a wide variety of connectivities, i.e. lack of tunnels. In order to achieve a voxel-based representation of a polygon, which representation is not limited to lack of 6-connected tunnels, the method of the present invention involves converting the 3-D polygon by determining the integer value of the coordinate direction w for each voxel in the voxel run, by a method including the following steps below.

First, a deferment logic variable is defined, and thereafter on the basis of the deferment logic variable, an initial value is set for the integer coordinate direction value w on the first edge of the active edge list. For each coordinate direction value u in the range between the u-th coordinate values of the first and last edges in the active edge list, the following steps are performed. For each voxel in the range, the integer coordinate value in the w coordinate direction is determined on the basis of the integer decision variable, the first and second integer decision thresholds and the integer depth increments. Voxels are placed in the discrete 3-D voxel space at the coordinate values if the coordinate direction value u is determined to be inside the polygon. Then the integer decision variable is updated using the integer decision variable increments.

Thereafter, the initial values for the coordinate direction value w on the first and last edges of the active edge list, are updated on the basis of the integer depth increment along the coordinate direction v, the depth increment along the first and last edges, and the deferment logic variable. Finally, the value of the deferment logic variable is determined on the basis of the amount of change in the initial values.

A variety of voxel-based representations for the polygonal objects, can be generated by placing voxels in the discrete voxel space at specific coordinate values. For example, in order to generate a discrete set of voxels lacking 18-connected tunnels, a pair of voxels are placed in the discrete voxel space $Z^3$ at coordinate values u, v and w, and u, v and w+1. Alternatively, to produce a discrete set of voxels lacking 18-connected tunnels, a pair of voxels can be placed in the discrete 3-D voxel space $Z^3$ at coordinate values u, v and w, and u, v and w−1. On the other hand, in order to produce a discrete set of voxels representing a polygon and lacking 26-connected tunnels, the method involves placing a triplet of voxels in the discrete 3-D voxel space $Z^3$, at coordinate values u, v and w, u, v and w+1, and u, v and w−1.

Another aspect of the present invention involves scan-converting 3-D polygon meshes, using the method of scan-converting 3-D polygons described above. Basically, the method involves using the method of scan-converting 3-D polygons in a repeated fashion for each polygon of the polygon mesh in $R^3$ space, so as to generate a 3-D voxel-based representation in $Z^3$ space for the plurality of connected 3-D polygons.

Another aspect of the present invention concerns a method of converting a continuous 3-D geometrical representation of a polyhedron, into a discrete set of voxels representing the polyhedron in discrete 3-D voxel space. The polyhedron has boundaries defined by a connected plurality of 3-D polygons enclosing an interior volume. The discrete 3-D voxel space is characterized by coordinate directions, where the addresses of the discrete 3-D voxel space are specified by integer coordinate values of the voxels.

In general, the method comprises converting the interior volume in continuous 3-D discrete geometrical space, into a discrete set of voxels representing the interior volume in discrete 3-D voxel space. Thereafter, for each 3-D polygon, the following steps are performed. First the geometrical parameters of the polygon are transformed into integer-based geometrical parameters. Then, the coordinate values of each voxel are determined by stepping along the coordinate directions in discrete 3-D voxel space and using at least one decisional logic process for one of the coordinate directions. The determination of the coordinate values is based upon the integer-based geometrical parameters.

In the preferred embodiment, scan-converting the polyhedron's interior volume into a discrete set of voxels, is carried out by performing the following steps. First the geometrical parameters of the polyhedron are transformed into integer-based geometrical parameters. The method involves defining a sequence of scan-planes parallel to one of the principal planes formed by two of the coordinate directions, and also a sequence of voxel runs within each scan-plane parallel to one of the coordinate directions. Notably, each voxel run has endpoints. Then, the coordinate values of the endpoints are determined by stepping along two coordinate directions in 3-D voxel space, and using at least two decisional logic processes for the coordinate directions, and placing the voxel runs in the discrete 3-D voxel space. The determination of the coordinate values of the endpoints, are based upon the integer-based geometrical parameters.

In another embodiment of the present invention, the step of determining the coordinate values of the endpoints, involves the following steps. First the minimum and maximum values of the x and y coordinate directions are determined from the vertices. Then for each integer value for y between the minimum and maximum values thereof which specify the y-th scan plane parallel to the x-z principal plane, the following sequence of steps is performed in a loop fashion. The extent of the x coordinate direction in the y-th scan-plane is determined. The z coordinate values of the endpoints are determined by stepping along the x coordinate direction. The manner in which the extent of the x coordinate direction in the y-th scan-plane is determined, is by carrying out the following steps. First, an active polygon list is formed from the polygon list. The polygon list is a subset of the polygon list in which the polgons intersect with the y-th scan-plane. Also, an active edge list is formed from the edge list. Similarly, the active edge list is a subset of the edge list in which the edges intersect with the y-th scan-plane and the active edge list is ordered by ascending coordinate direction x, where the edge list has a first and last edge. Thereafter, for each edge in the active edge list, the method involves stepping along the edge according to the x-y slope of the edge. Also, the active edge list and the active polygon list are both maintained.

In the preferred embodiment, the manner in which the z coordinate values of the endpoints are determined by stepping along the x coordinate direction, is by carrying out the following steps as follows. For each coordinate direction value x defining the x-th scan-line in the y-th scan-plane where x is in the range of the extent thereof, the following steps are performed in a loop fashion. For each polygon in the active polygon list, the method involves stepping along the polygon in the z coordinate direction on the basis of at least one of the geometrical parameters. For each polygon having an edge in the active edge list which intersects the x-th scan line, the active polygon list is maintained, and the z coordinate direction value along the polygon is updated. Also, the method involves placig runs of voxels in the discrete 3-D voxel space between pairs of z coordinate direction values of the polygons in the active polygon list.

As a result of the present invention, continuous 3-D geometrical representations of a wide variety of forms, can be scan-converted into discrete 3-D voxel-based representations having a variety of connectivities, lack of tunnels, and lack of cavities, while utilizing all integer arithmetic, and decisional process loops, which are symmetrical (i.e. logically identical) with respect to the principal planes of the coordinate reference system.

In addition, the scan-conversion method of the present invention provides computationally efficient processes by which polygonal objects, including 3-D polygons and 3-D polyhedra in continuous 3-D geometrical space, can be converted into discrete 3-D voxel representations thereof. Such scan-conversion processes are achieved while obeying the fidelity, connectivity and efficiency requirements. Also, the scan-conversion processes are incremental in nature and use only simple operations within their inner decisional process loops. The method of the present invention performs 3-D scan-conversion process and temporal complexities which are linear in the number of voxels in the objects to be scan-converted. In addition, the method of the present invention can scan-convert 3-D polygons and 3-D polyhedra whose dimensional extents in continuous 3-D geometrical space $R^3$ exceeds the dimensional extent (i.e. bounds or limits) of the discrete voxel space $Z^3$ of the Cubic Frame Buffer, with no added complexity. Furthermore, the scan-conversion methods of the present invention are performed using integer variables and integer operations only.

BRIEF DESCRIPTION OF THE DRAWINGS

For a full understanding of the objects of the present invention, reference is made to the following detailed description of the preferred embodiment which is to be taken in connection with the accompanying drawings, wherein:

FIG. 8A is a graphical representation of a hollow 3-D voxel-based teapot represented in $Z^3$ space;

FIG. 8B is a side cross-sectional view of the 3-D voxel-based teapot of FIG. 8A;

FIG. 9B is a computer program implementation of a symmetrical method for scan-converting 26-connected 3-D lines according to the principles of the present invention;

FIG. 9D is a computer program implementation of a symmetrical method for scan-converting 3-D 18-connected line segments, according to the principles of the present invention;

FIG. 9E is a computer program implementation of a symmetrical method for scan-converting 3-D 6-connected line segments, according to the principles of the present invention;

FIG. 10B is a computer program implementation of a method for scan-converting the interior region bounded by the edges of a 3-D polygon, the dimensional extents of which in $R^3$ space exceed the dimensional extent in $Z^3$ space, i.e. in the case of "clipping";

FIG. 11B is a computer program implementation of a method for scan-converting the interior volume bounded by continuous 3-D polyhedra, according to the principles of the present invention;

FIG. 11Bi is a computer subprogram UPDATE POLY of the computer program of FIG. 11C;

FIG. 11Bii is the computer subprogram DEPTH FILL of the computer program of FIG. 11C, which is used to place runs of voxels along scan-lines in the z coordinate direction; and FIG. 11C is a computer program implementation of a method of scan-converting the interior volume enclosed by a continuous 3-D polyhedra, the dimensional extent of which in $R^3$ space exceeds a dimensional extent of the $Z^3$ space (i.e. clipping) of, for example, the Cubic Frame Buffer of FIG. 1.

DETAILED DESCRIPTION OF THE PREFERRED EMBODIMENTS OF THE PRESENT INVENTION

Figure 9C:
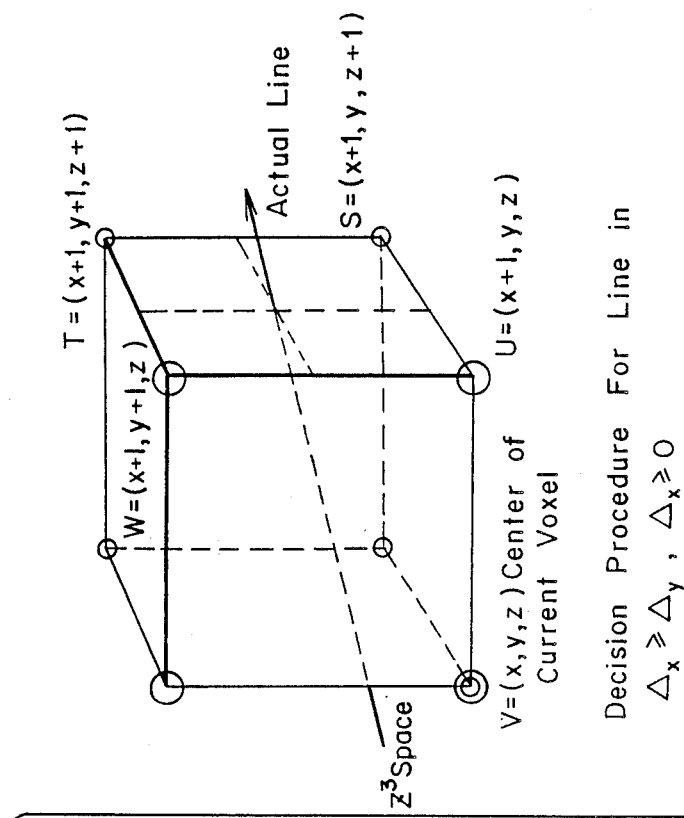
FIG. 9C is a schematic representation of the coordinate directions of a voxel in discrete 3-D voxel-image space which is used in incrementally scan-converting 3-D line segments according to the principles of the present invention.
Figure 9A:
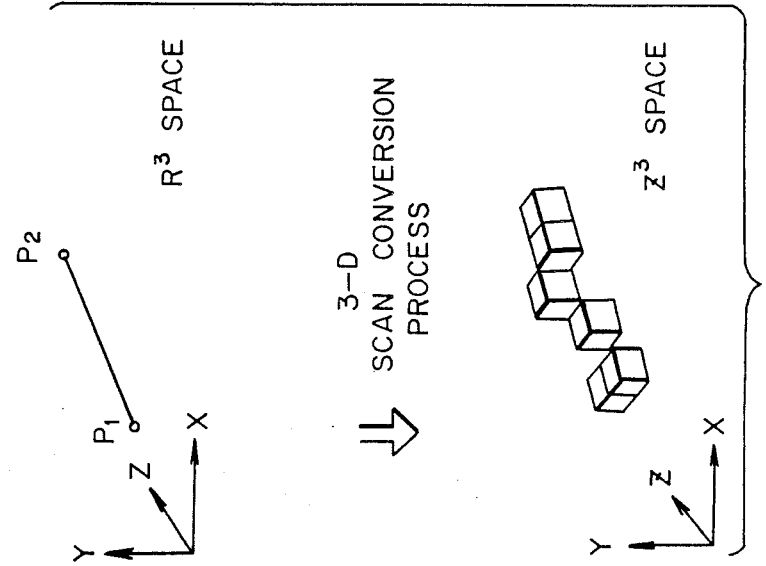
FIG. 9A is a schematic representation of 3-D scan-conversion of a straight line segment represented in continuous 3-D geometric-object space, into a 3-D voxel-based representation in discrete 3-D voxel-image space.

Referring to FIGS. 9A, 9B and 9C in particular, the method of scan-converting a continuous 3-D straight line segment with positive x, y and z extents, into a discrete set of n voxels connected together with 26-connectivity, will now be described.

In FIG. 9A, a 3-D straight line segment 1 is defined by two end points $P_1$ and $P_2$ within a 3-D continuous Cartesian (i.e. x, y and z) coordinate system, where the end points $P_1$ and $P_2$ have integer coordinates, $P_1=(x_1, y_1, z_1)$ and $P_2=(x_2, y_2, z_2)$. The goal of the scan-conversion method of the present invention, is to determine the set of n voxel coordinates (x, y, z) within the 3-D discrete voxel-image space coordinate system, $Z^3$, that most closely approximates the continuous 3-D line segment defined in the 3-D continuous Cartesian coordinate system, $R^3$, and with different types of voxel connectivities. Notably, this function is carried out incrementally using (i) only integer arithmetic and (ii) symmetrical decisional process loops for determining the x, y, and z coordinates of each voxel.

The first stage of the scan-conversion method involves computing the value of integer n, in order to determine the number of sample points to be sampled along the continuous 3-D straight line segment. Notably, the integer n corresponds to the number of voxels in the discrete set of n voxels in 3-D discrete voxel-image space $Z^3$. Also, integer n corresponds to the number of "decisional process loops" to be carried out in the present method, i.e. one loop being executed for each set of voxel coordinate values $(x_1, y_1, z_1)$, for $i=0, 1, \ldots n$.

Depending on the type of "voxel connectivity" desired or required in the voxel-based model of the 3-D straight line segment, (i.e. 6-connectivity, 18-connectivity, or 26-connectivity), integer n will take on a different integer value for a particular 3-D continuous straight line segment. For the case of 26-connected lines, n, the estimate for the length (in voxels) of the line, is given by: $n=\text{MAX}(\Delta x, \Delta y, \Delta z)$ where $\Delta x=x_2-x_1$; $\Delta y=y_2-y_1$; $\Delta z=z_2-z_1$; $P_2=x_2, y_2, z_2$; $P_1=x_1, y_1, z_1$; and $\Delta x, \Delta y, \Delta z \geq 0$. The number of voxels in the line segment is exactly $\text{MAX}(\Delta x, \Delta y, \Delta z)+1$, including the starting point voxel.

The next stage of the scan-conversion method involves definition and initialization of the parameters and variables of the process. This step involves defining integer voxel-coordinate error (i.e. decision) variables $e_x$, $e_y$, and $e_z$ for x, y and z coordinate directions, respectively, and first and second error variable increments, $d1_x, d2_x; d1_y, d2_y;$ and $d1_z, d2_z$ along each of the x, y and z coordinate directions.

In the preferred embodiment for the 3-D line segment in $Z^3$ space, the integer voxel-coordinate error variables $e_x$, $e_y$ and $e_z$ and first and second error variable increments along each x, y and z coordinate directions are given as:

$$e_x=2^*\Delta x-n;$$

$$d1_x=2^*\Delta x;$$

$$d2_x=2^*(\Delta x-n);$$

$$e_y=2^*\Delta y-n;$$

$$d1_y=2^*\Delta y;$$

$$d2_y=2^*(\Delta y-n);$$

$$e_z=2^*\Delta z-n;$$

$$d1_z=2^*\Delta z;$$

$$d2_z=2^*(\Delta z-n);$$

Notably, the above set of parameter definitions are given in a preferred form, to simplify the decisional process loop and operations therein for determining x, y and z coordinates for the voxels. However, these parameter definitions can take on other forms without departing from the invention.

Next, the first end point $P_1=x, y,$ and z, is then written into the 3-D Cubic Frame Buffer and represents the coordinate values of the first voxel $V_{i=1}$ in $Z^3$ space.

Entering the decisional process loop, the integer coordinate values $x_i, y_i, z_i$ for each voxel $V_i$ are determined so that such integer coordinates are closest to a corresponding sample point of the 3-D line segment in $R^3$ space. This process is carried out for each $x_i, y_i$ and $z_i$ integer coordinate value $i=1, 2, \ldots, n$, as follows.

For each x, y or z coordinate direction, a simple decision process is performed to determine whether or not to either increment the respective coordinate direction. For example, if $e_x$ is greater than or equal to the decision threshold zero, then x is incremented by integer value "1" and $e_x$ is incremented by second error (i.e.

decision) variable increment $d2_x$, but if $e_x$ is less than the decision threshold, then x is not changed in value and $e_x$ is updated by the first error variable increment $d1_x$. Similarly and independently, the above described decision process is carried out for y and z coordinate directions. Notably, since the same type decision process is executed for each x, y and z coordinate direction, the coordinate direction decision process is "symmetric in x, y, and z coordinate directions."

After determining the $x_i$, $y_i$, and $z_i$ integer coordinate values, these values are used as the coordinate values of the corresponding voxel written into the 3-D Cubic Frame Buffer. The above process is then repeated for n times to generate the set of x, y and z coordinate values for the discrete set of n voxels connected together with "26-connectivity".

Since the decision process for the three x, y and z coordinates are carried out independently, for the "26-connectivity" case, one, two and/or three coordinates may be simultaneously changed at any step, i.e. for each voxel. In contrast, in the "6-connectivity" case, at most, one coordinate value may change at any step, i.e. for any voxel, and for the "18-connectivity" case, at most two coordinate values change at any step in the scan-conversion process of the present invention.

For the "6-connectivity" and "18-connectivity" type 3-D line segments in $Z^3$ space, similar processes as described above are performed, with however, several modifications described below.

Referring now to FIG. 9E, the method of scan-converting into a 6-connected 3-D line segment is illustrated, where n is computed by $$n = \Delta x + \Delta y + \Delta z$$

where $\Delta x$, $\Delta y$, and $\Delta z \geq 0$.

Also, the decision parameter definitions are the same. However, the decision logic in the decisional process loop is different. In particular, the decision logic seeks to determine the largest integer voxel-coordinate error variable $e_x$, $e_y$, or $e_z$, and increment coordinate value only along the corresponding coordinate direction. For example, if $e_x$ is greater than or equal to both $e_y$ and $e_z$, then x is incremented by an integer value 1, and $e_x$ is incremented by the second error variable increment $d2_x$, and both $e_y$ and $e_z$ are incremented by the corresponding first error variable increments $d1_y$ and $d1_z$, respectively, while coordinates y and z are unchanged.

Referring now to FIG. 9D, the method of scan-converting into an 18-connected 3-D line segment is illustrated, where n is computed by $$n = MAX\ [MAX(\Delta x, \Delta y, \Delta z),$$
$$CEILING[(\Delta x + \Delta y + \Delta z)/2]],$$

where $\Delta x$, $\Delta y$ and $\Delta z \geq 0$, and
where "CEILING" represents selecting the smallest integer which is larger than the argument of CEILING function.

Also, the definitions of the decision parameters remain the same as in both the 26 and 6 connectivity cases. However, the decision logic in the decisional process loop is different. In particular, the decision logic seeks to determine the two largest voxel coordinate error (i.e. decision) variables, and then decides whether or not to increment the corresponding coordinate values. For example, if $e_y$ and $e_z$ are the largest voxel-coordinate error variables, then x is not incremented, $e_x$ is updated by the first error variable increment dlx, and two independent decision procedures for coordinate directions y and z are carried out. For example, if $e_y$ is greater than or equal to the decision threshold zero, then y is incremented by integer value "1", and $e_y$ is incremented by the second error variable increment $d2_y$; but if $e_y$ is less than zero, then y is unchanged (i.e. not incremented) and $e_y$ is incremented by the first error variable increment $d1_y$.

The above described methods of scan-conversion have been implemented in pseudo-C programming code and are shown in FIGS. 9B, 9C and 9D.

Figure 10:
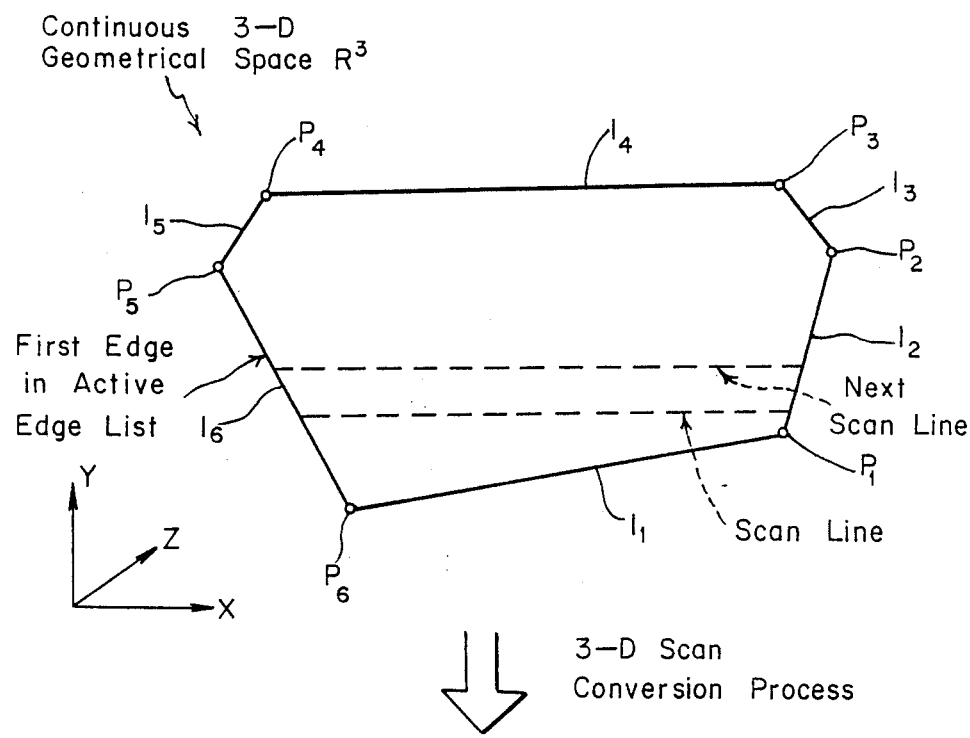
FIG. 10 is a schematic representation of 3-D scan-conversion of a 3-D polygon represented in continuous 3-D geometric space $R^3$, into a 3-D voxel-based representation thereof in discrete 3-D voxel-image space $Z^3$, according to the principles of the present invention.
Figure 10:
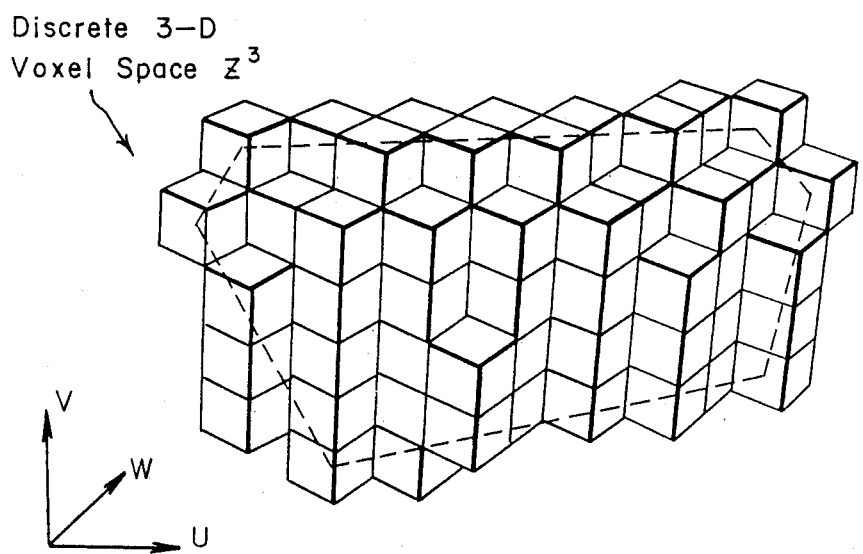
Figure 10A:
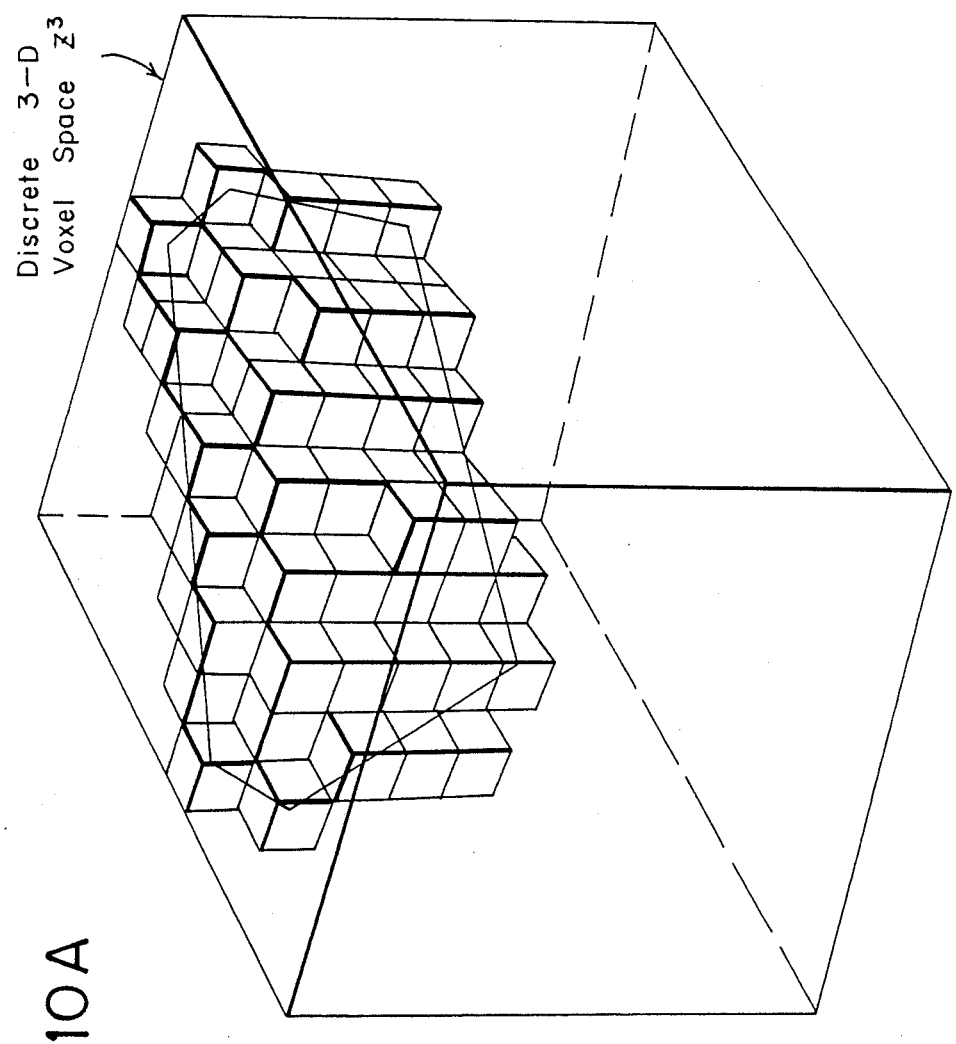
FIG. 10A is a schematic representation of the 3-D voxel-based representation of the 3-D planar polygon of FIG. 10, shown within finite boundaries of discrete 3-D voxel space $Z^3$.

Referring now to FIGS. 10, 10A and 10B, the method for converting continuous 3-D polygons into a discrete set of voxels connected together and lacking 6-connected tunnels, will now be described below as follows.

For purposes of illustration, the case of a 3-D planar polygon having six (6) vertices, six (6) "edges" (i.e. sides), no "holes", and which is not self intersecting, will be considered.

In FIG. 10, a 3-D planar polygon is geometrically represented in continuous 3-D geometrical space $R^3$, as a closed sequence of six vertices $P_1$, $P_2$, $P_3$, $P_4$, $P_5$ and $P_6$, and six "edges" (i.e. sides) $l_1$, $l_2$, $l_3$, $l_4$, $l_5$ and $l_6$, where each edge has first and second endpoints as illustrated in FIG. 10, in particular. Hereinafter, this closed sequence of edges is referred to and represented by a "edge list".

The goal of the scan-conversion method of the present invention, is to determine the set of voxel coordinates within the discrete 3-D voxel space coordinate system, $Z^3$, that closely approximates the 3-D planar polygon defined in the 3-D continuous Cartesian coordinate system, $R^3$, and with different types of voxel connectivities (i.e. different types of voxel arrangements lacking different kinds of "tunnels").

While not a requirement of the present invention, but preferred in order to provide a more computationally efficient method, the coordinates of the polygon vertices $P_1$ through $P_6$ are integer or fixed-point values, rather than floating-point values.

In addition, the coordinates of the polygon vertices $P_1$ through $P_6$ should lie approximately within a plane in order to satisfy "co-planarity" amongst the vertices.

In the first embodiment of the present invention to be described below, the dimensional extent of the 3-D planar polygon in $R^3$ space, is completely within the dimensional extent of the discrete 3-D voxel space $Z^3$, of for example the Cubic Frame Buffer 2 illustrated in FIG. 1. However, the method of the present invention is capable of scan-converting 3-D polygonal objects having dimensional extents in 3-D geometrical space $R^3$ that are greater than a dimensional extent of the 3-D voxel space $Z^3$, into which the object is to be converted.

In general, the method of the present invention allows the scan-conversion of 3-D polygons, by scan-converting its polygon boundary, and for its interior region bounded by the polygon boundary.

The polygon boundary can be scan-converted using the method of scan converting 3-D line segments as discussed in detail hereinbefore. Thus, the preferred embodiment of the method for scan-converting the interior region of the polygon, will now be described in detail as follows.

The first stage of the scan-conversion method involves computing the values of the coefficients of the approximate plane equation known in the art. Notably, these coefficients represent geometrical parameters of the 3-D polygon. This computation is based upon the coordinates of all the vertices $P_1$ through $P_6$, and are proportional to the areas of the projections of the polygon onto the principal axes planes. Numerical formulas for computing the values of the coefficients can be found on pages 512-513 of "Fundamentals of Interactive Computer Graphics (1982)", by J. D. Foley and A. van Dam.

The next stage of the scan-conversion method involves specifying a generalized coordinate system having orthogonal coordinate directions u, v and w, which form three principal planes u-v, u-w and v-w. Notably, the u, v and w axis of the generalized coordinate system coincide with the x, y and z axis, not necessarily "respectively". This is an important feature. The addresses of the discrete 3-D space $Z^3$, is specified by integer u, v and w coordinate direction values in such a way that the 3-D polygon has an area of projection which is greatest on the u-v plane and has a coordinate direction extent of smallest value along coordinate direction w. Also, the plane equation ha the following form:

$$\alpha u + \beta v + \Gamma w + D = 0$$

Herein, w is referred to as the "depth direction" of the polygon.

The next stage of the scan-conversion method involves computing first and second integer decision thresholds $+\Gamma$, $-\Gamma$, integer decision variable increments:

$$\Delta = -2^*\alpha$$

$$\Delta_1 = \Delta - 2^*\Gamma$$

$$\Delta_2 = \Delta + 2^*\Gamma, \text{ and}$$

integer depth increments:

$$\Delta w_u = -\alpha/\Gamma$$

$$\Delta w_v = -\beta/\Gamma.$$

The next step of the scan-conversion method involves computing, from polygon vertices $P_1$ through $P_6$, the minimum values of u and v coordinate directions, $u_o$ and $v_o$ respectively, and the maximum values of u and v coordinate directions $u_f$ and $v_f$, respectively.

In order to carry out the method where the 3-D polygon has a dimensional extent greater than a dimensional extent of the discrete 3-D voxel space $Z^3$, these values $u_o$, $v_o$ and $u_f$ and $v_f$ are bounded, i.e. limited, by the minimum and maximum values of the corresponding coordinate directions in discrete 3-D voxel space $Z^3$.

The minimum and maximum values $w_o$ and $w_f$ for coordinate direction w, are computed based on these bounded values and the plane equation of the polygon. For example, in the case where the minimum values of coordinate directions u and v are (0, 0), then $w_o$ is computed as follows:

$$w_o = MAX(0, u_o)^*\Delta w_u + MAX(0, v_o)^*\Delta w_v - D/\Gamma.$$

For each edge of the polygon, $l_1$ through $l_6$, the following procedure is carried out. First, to ensure that the v coordinate of the first endpoint of each edge is smaller than that of the second endpoint, an endpoint interchange process is performed whereby the first endpoint is interchanged with the second endpoint to satisfy the above condition.

Secondly, the slope, "l.$\Delta$u," of the edge in the u-v plane is computed as the quotient of the v extent and the u extent of the edge. Thirdly, the depth increment, "l.$\Delta$uw," along the edge is computed as "$\Delta w_u$ * l. $\Delta$u". Finally, the u coordinate value "l.u" which varies along the edge length, is set to the value of the u coordinate of the first endpoint of the edge.

The next step of the scan-conversion method involves ordering (i.e. sorting) the edge list by ascending values of v coordinate of the first endpoint. In the case where two v coordinate values are the same (i.e. a "tie") then the two edges are ordered according to the u coordinate value of the first endpoint thereof. If there continues to be a further "tie", then the two edges are ordered according to the u coordinate value of the second endpoint.

Entering the outer loop (i.e. the v-loop) of the method hereof, where integer v ranges between the bounded (i.e. limited) values of $v_o$ and $v_f$, the following steps are carried out. It is first noted however, that each v value in the loop corresponds to a v-th scan line parallel to the generalized coordinate direction u, as illustrated in FIG. 10, for example.

Figure 1:
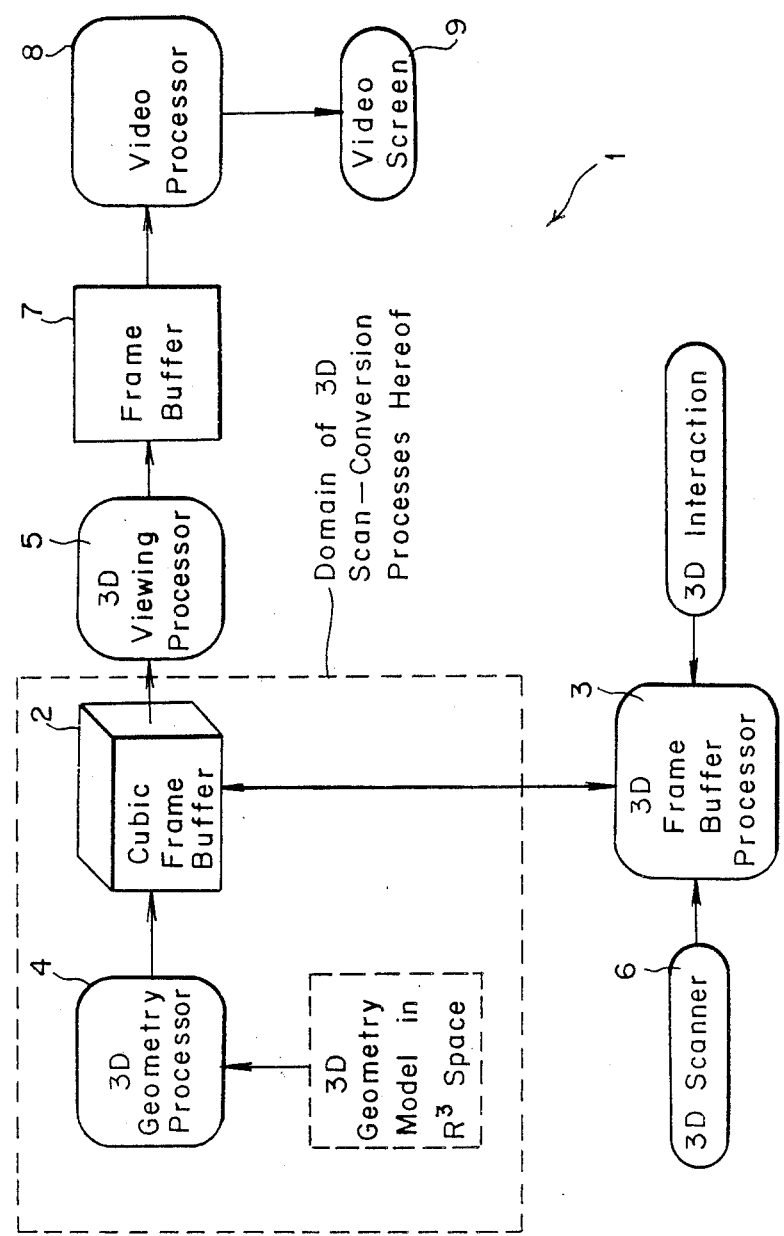
FIG. 1 is a block diagram of a 3-D voxel-based graphics workstation on which the 3-D scan-conversion methods of the present invention can be carried out.
Figure 2:
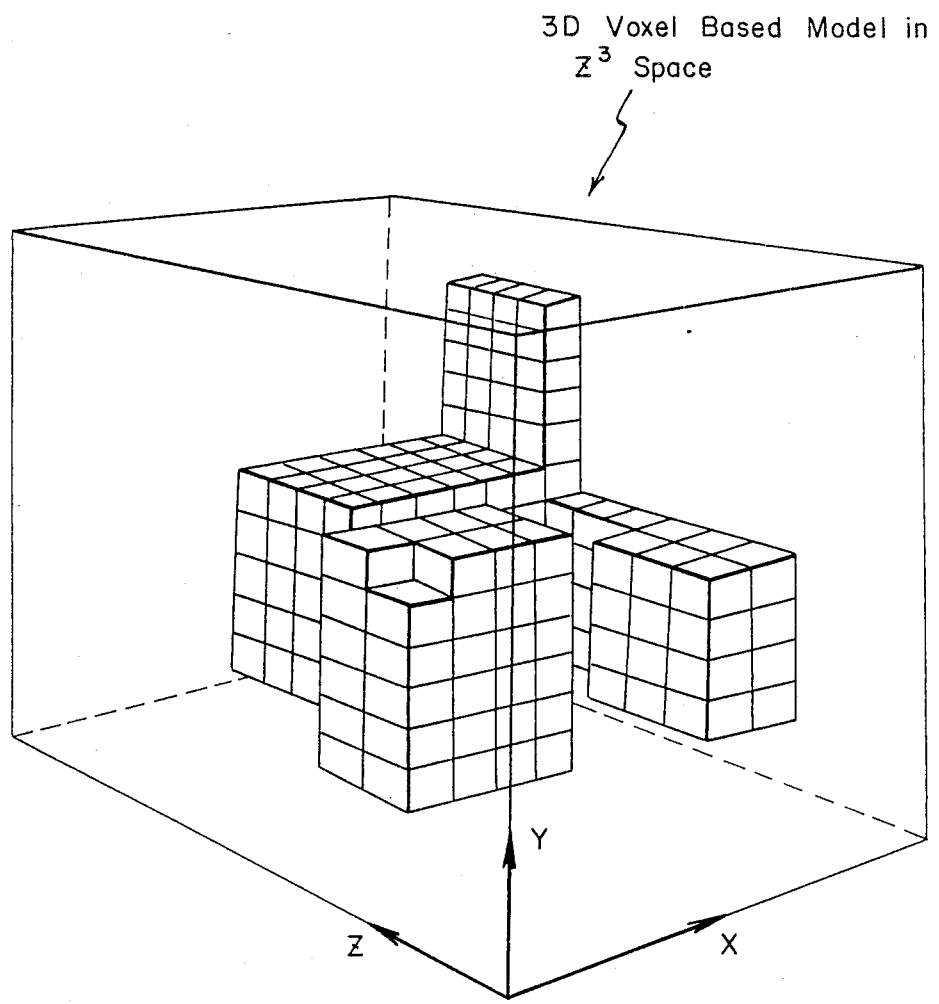
FIG. 2 is a schematic diagram of a 3-D cellular array model of the 3-D Cubic Frame Buffer of the voxel-based graphics system of FIG. 1.
Figure 3:
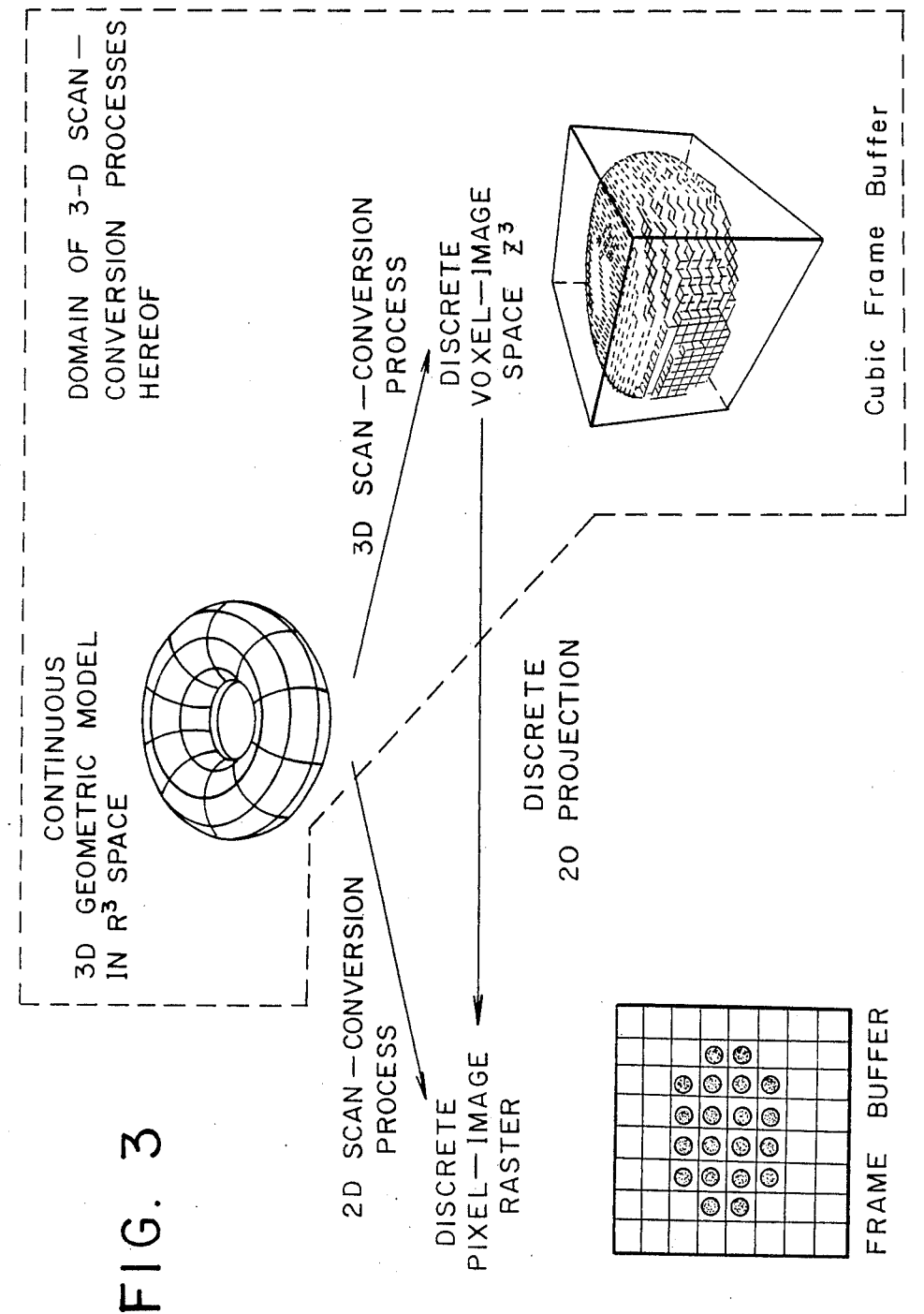
FIG. 3 is a schematic diagram illustrating 2-D and 3-D scan-conversion processes and their relationship with discrete 2-D pixel-image space and discrete 3-D voxel-image space, respectively.
Figure 4:
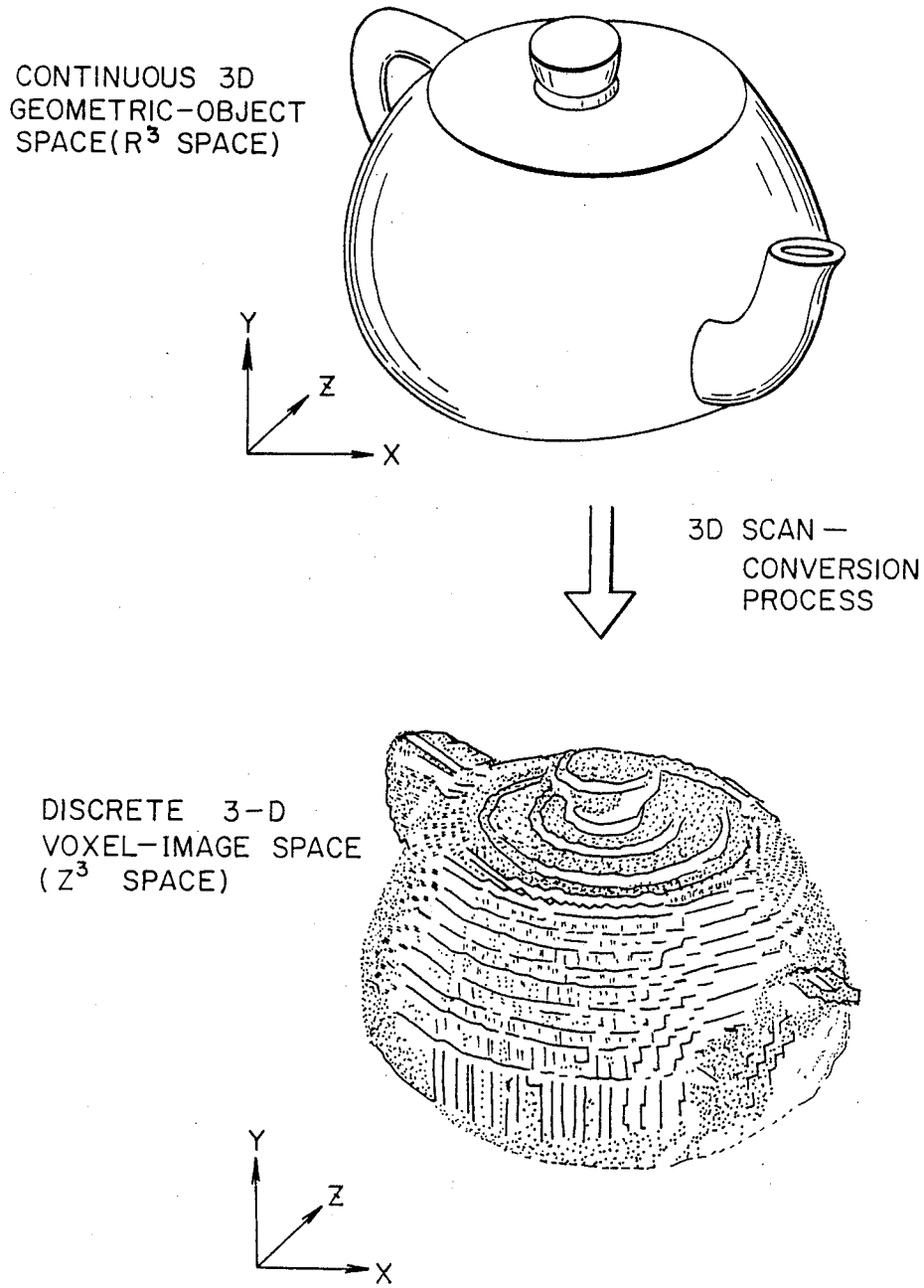
FIG. 4 is a schematic diagram illustrating the scan-conversion of a continuous 3-D object represented in continuous 3-D geometrical object space $R^3$, into a discrete 3-D voxel-based representation in discrete 3-D voxel-image space $Z^3$, according to the principles of the present invention.
Figure 5A:
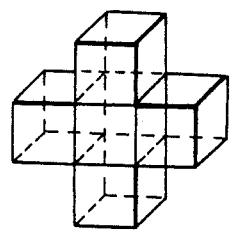
FIG. 5A is a graphical representation of neighboring voxels that share a face.
Figure 5B:
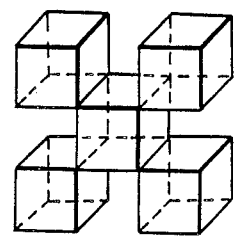
FIG. 5B is a graphical representation of voxels that share a side.
Figure 6A:
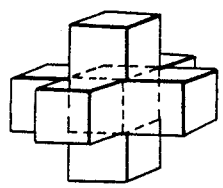
FIG. 6A is a graphical representation of an arrangement of neighboring voxels according to the definition of 6-connected neighbors.
Figure 5C:
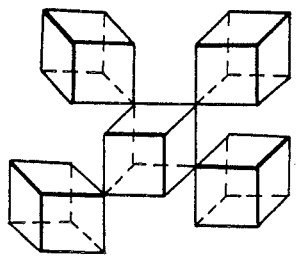
FIG. 5C is a graphical representation of voxels that share a corner.
Figure 6C:
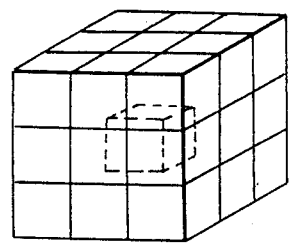
FIG. 6C is a graphical representation of neighboring voxels arranged according to the definition of 26-connected neighbors.
Figure 6B:
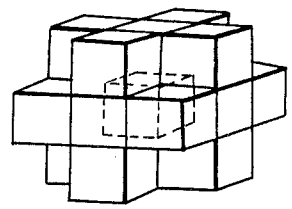
FIG. 6B is a graphical representation of neighboring voxels arranged according to the definition of 18-connected neighbors.

The current v coordinate direction value is placed in the corresponding address register of the Cubic Frame Buffer 2 in FIG. 1. Thereafter, for each integer value v, the coordinate values of the u coordinate direction corresponding to the endpoints of voxel runs along the v-th scan line, are determined. These voxel runs are contained fully within the polygon, and are not necessarily of rectilinear arrangement, and therefore the coordinate direction value w of each voxel in each voxel run, are determined separately using the loop for the u coordinate direction.

In order to efficiently determine the voxel runs, an active edge list is maintained. The active edge list is a subset of the edge list containing all of the edges of the polygon which intersect with the current v-th scan line. The active edge list is maintained in the same ordered manner as is the edge list, and it is dynamically updated by a process of adding and deleting edges.

While still in the outer loop (i.e. the v-loop), for each edge 1 in the active edge list, the u coordinate value along edge 1 is updated by the value "l.$\Delta$u" which is the slope of the edge 1.

In the special case where the polygon is self-intersecting (i.e. non simple), the previous updating step may have changed the order of the edges in the active edge list, and thus the active edge list is reordered (i.e. resorted) in a manner as described above.

For each edge 1 in the edge list, in which the v-th coordinate of the first endpoint equals the coordinate value v, the edge is inserted (i.e. added) into the active edge list in the proper place so as to preserve the order of edges in the active edge list.

For each edge in the active edge list in which the v-th coordinate of the second endpoint equals the coordinate direction value v, that edge is deleted (i.e. removed) from the active edge list.

In the case where the minimum u coordinate direction $u_o$ is outside of the corresponding dimensional extent of the discrete 3-D voxel space $Z^3$ of the Cubic Frame Buffer 2, the active edge list is searched to locate the first run of voxels which lies inside the 3-D voxel space of the Cubic Frame Buffer 2.

The next step in the scan-conversion process involves placing the value of the initial depth value $w_o$ at the beginning of the v-th scan line, into the corresponding address register of the Cubic Frame Buffer 2.

The next stage of the scan conversion method of the present invention, involves entering the inner loop (i.e. the decisional process loop) for the coordinate direction u, where the coordinate direction value u ranges from the u coordinate value of the first and last edges in the active edge list. In the case where the dimensional extent of the polygon in $R^3$ space exceeds the dimensional extent of the u coordinate direction, these range values described above are bounded (i.e. limited) by the dimensional extent of the discrete 3-D voxel space $Z^3$ of, for example, the Cubic Frame Buffer in the described embodiment. Notably, however, not all "dimensional extents" will be associated with a Cubic Frame Buffer, but may exist in $Z^3$ spaces defined elsewhere.

Inside the decisional process loop (i.e. u-loop), the following steps are performed as follows. First, the method involves determining whether the u coordinate direction value is "inside" the polygon. This determination is made by comparing the u coordinate direction value with the u coordinate direction value of th current edge in the active edge list. If the u coordinate direction value is determined to be within a run of voxels which is contained inside the polygon, then the u coordinate value is placed in the corresponding address of the Cubic Frame Buffer 2, and a voxel specified by the address registers U, V and W as corresponding to u, v and w coordinate directions respectively, is placed in the Cubic Frame Buffer 2.

The next step of the scan-conversion method involves the decisional process itself, to determine the integer coordinate value in the w coordinate direction, for the subsequent voxel along the voxel run of the v-th scan-line.

First, the integer decision variable dw is compared with the first integer decision threshold, $+\Gamma$. If the decision variable dw is greater than decision threshold $+\Gamma$, then the integer coordinate direction w is incremented by integer value "1" and the integer decision variable dw is updated by integer depth increment $\Delta - 2 * \Gamma$. Otherwise, if the integer decision variable dw is less than the second integer decision threshold $-\Gamma$, then the integer coordinate direction value of w is decremented by integer value "1", and the decision variable dw is updated by the integer depth increment $\Delta + 2 * \Gamma$. If neither case holds true, then the integer coordinate direction value of w is unchanged, and the integer decision variable dw is updated by $\Delta$.

Before continuing with the (v+1)-th scan-line, the method involves updating the initial value for the coordinate direction value $w_o$ on the first edge of the active edge list. This updating process is carried out by incrementing $w_o$ by the sum of the integer depth increment along coordinate direction v, "$\Delta w_v$", and the depth increment along the first edge of the active edge list, "current.$\Delta uw + \Delta w_o$".

Upon completion of the entire outer loop for the v range, all of the scan-lines of the polygon are converted into runs of discrete voxels, which together, form the entire discrete set of voxels representing the 3-D polygon in discrete 3-D voxel space $Z^3$.

In the embodiment described above, the integer coordinate values of each voxel have been determined by stepping along the u and v coordinate directions in discrete 3-D voxel space, and using one decisional logic process for only the w coordinate direction of the generalized coordinate system. However, in an alternative embodiment, the integer coordinate values of each voxel can be determined by stepping along the u and v coordinate directions, and using a decisional logic process for determining (i) the w coordinate direction and (ii) the integer initial depth value $w_o$ along the first edge in the active edge list. Below, modification to the hereinbefore described method will be described which results in the above-described alternative scan-conversion method.

Before entering the outer (i.e. v) loop of the scan-conversion method, the following initialization loop is performed. For each edge in the edge list, the following "initial depth decision process parameters" are computed:

integer initial depth thresholds, $l.T_1$, and $l.T_2$;

integer initial depth decision variable increments, $l.INC$, $l.INC_1$, and $l.INC_2$;

integer initial depth increments, $l.Q$, $l.Q_1$ (equals $l.Q+1$), and $l.Q_2$ (equals $l.Q-1$).

Notably in this embodiment, initial depth value $w_o$, the initial depth decision variable $dw_o$, and all of the above-described decision process parameters are integer values. Specifically, the integer $w_o$ can be placed in the corresponding address register of the Cubic Frame Buffer 2, without requiring rounding operations. This feature avoids the computationally intensive rounding operations and thus it is more efficient.

The decision process loop itself occurs in the method, after completion of the inner "u" loop and before commencing the subsequent cycle of the outer "v" loop. This decision process includes the determination of the value of $w_o$, which is the initial value of the w coordinate on the first edge of the active edge list.

First, if the initial depth decision variable $l.dw_o$ is greater than the initial depth threshold "$l.T_1$", then $w_o$ is incremented by the initial depth increment $l.Q_1$, and the initial depth decision variable $l.dw_o$ is updated by the initial depth decision variable increment "$l.INC_1$".

Otherwise, if the initial depth decision variable $l.dw_o$ is less than the initial depth threshold "$l.T_2$", then $w_o$ is incremented by the initial depth increment $l.Q_2$, and the initial depth decision variable $l.dw_o$ is updated by the initial depth decision variable increment "$l.INC_2$".

If neither of these conditions hold true, then $w_o$ is incremented by the initial depth increment $l.Q$ and the initial depth decision variable $l.dw_o$ is updated by the initial depth decision variable increment $l.INC$.

By carrying out the above modifications, the alternative scan conversion method is thusly provided.

Notably, when $w_o$ for the scan-line $v+1$ is determined by the above decision process, the value by which $w_o$ for scan line v is incremented, may be greater than integer value "1". This is unlike the decisional process for the determination of the coordinate direction value w along a scan-line, which is described in the first embodiment above. In the first embodiment, the value w is incremented by integer value "1", "$-1$", or "0" (unchanged). Notwithstanding these minor differences, both decisional processes for determination of the initial value of $w_o$ and the determination of w along any particular scan-line, are conceptually similar in that they both employ similar decisional logic and completely avoid the brute-force computational-based approached characteristic of prior art scan-conversion methodologies.

In the embodiments described above, the integer coordinate values of each voxel have been determined by stepping along the u and v coordinate directions in discrete 3-D voxel space, and using, (i) two decisional logic processes for the w coordinate direction of the generalized coordinate system and (ii) the integer initial depth value $w_o$ along the first edge of the active edge list. However, in yet another alternative embodiment, the integer coordinate values of each voxel can be determined by stepping along the u and v coordinate directions, and using a decisional logic process for determining (i) the w coordinate direction, (ii) the integer initial depth value $w_o$ along the first edge in the active edge list, and (iii) the integer coordinate direction value u along all the edges in the active edge list. Below, modifications to the hereinbefore described methods will be described, which result in the above-described alternative scan-conversion method.

Before entering the outer (i.e. "v") loop of the scan-conversion method, the following initialization loop is performed. For each edge in the edge list, the following "edge decision process parameters" are computed:

integer edge decision thresholds, $l.ET_1$, and $l.ET_2$;

integer edge decision variable increments, l.EINC, $l.EINC_1$, and $l.EINC_2$; and integer u increments, l.EQ, $l.EQ_1$ (equals l.EQ+1), and $l.EQ_2$ (equals l.EQ−1).

Notably in this particular embodiment, the coordinate direction value along each edge "l.u", the edge decision variable dE, and all of the above-described "decision process parameters" are integer values. Specifically, the integer l.u can be used directly as the initial u coordinate for the inner loop (i.e. the u-loop), without requiring rounding operations. This feature avoids the computationally intensive rounding (i.e. "FLOOR" or truncation) operations and thus it is more efficient.

In this preferred embodiment of the method, the decisional process loop itself occurs inside the outer loop (i.e. the v-loop) and before the reordering of the active edge list. This decision process includes, for each edge in the active edge list, the determination of the value of l.u, which is the u coordinate value along the edge.

First, if the edge decision variable l.Ed is greater than the edge decision threshold "$l.ET_1$", then l.u coordinate value is incremented by the u increment $l.EQ_1$, and the edge decision variable l.Ed is updated by the edge decision variable increment "$l.EINC_1$".

Otherwise, if the edge decision variable l.Ed is less than the edge decision threshold "$l.ET_2$", then l.u is incremented by the u increment $l.EQ_2$, and the edge decision variable l.Ed is updated by the edge decision variable increment "$l.EINC_2$".

If neither of these conditions hold true, then l.u is incremented by the u increment l.EQ and the edge decision variable l.Ed is updated by the edge decision variable increment l.EINC.

By carrying out the above modifications, the alternative scan-conversion method is thusly provided.

Notably, for each edge "l." in the active edge list, when "l.u" for the (v+1)-th scan-line is determined by the above decisional process, the value by which "l.u" for the v-th scan line is incremented, may be greater than integer value "1". This is unlike the decisional process for the determination of the coordinate direction value w along a scan-line, which is described in the first embodiment above. In the first embodiment, the value w is incremented by integer value "1", "−1", or "0" (unchanged). Notwithstanding these minor differences, both decisional processes for determination of initial value of $w_o$ and the determination of w along any particular scan-line, are conceptually similar in that they both employ similar decisional logic and completely avoid the brute-force computational-based approach which is characteristic of prior art scan-conversion methodologies.

Figure 7D:
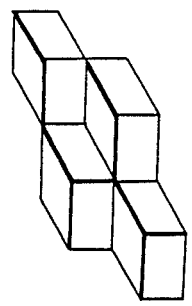
FIG. 7D is a graphical representation of a discrete set of voxels arranged so as to exhibit lack of 6-connected tunnels.
Figure 7B:
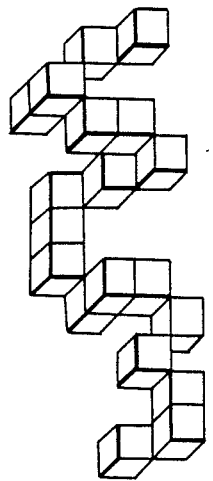
FIG. 7B is a graphical representation of voxels arranged in an 18-connected path.
Figure 7A:
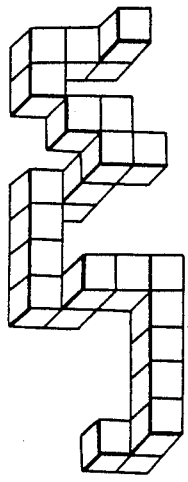
FIG. 7A is a graphical representation of a sequence of voxels arranged in a 6-connected path.

In the above-described embodiments of the method of scan-converting 3-D polygons, the resultant connectivity of the discrete set of voxels in $Z^3$ space, is only lacking 6-connected tunnels. In connection therewith, reference is made to FIG. 7D which is a graphical representation of a voxel-based surface which lacks only 6-connected tunnels, yet in which 18-connected and 26-connected tunnels do exist. Notably, there are applications where such types of voxel-based surfaces are simply not desired.

Figure 7F:
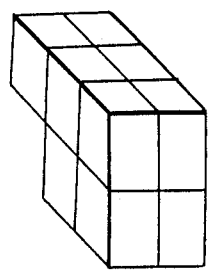
FIG. 7F is a graphical representation of a discrete set of voxels arranged so as to exhibit lack of 26-connected tunnels
Figure 7E:
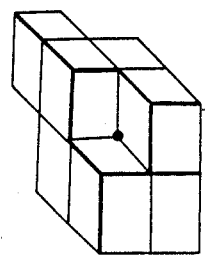
FIG. 7E is a graphical representation of a discrete set of voxels arranged so as to exhibit lack of 18-connected tunnels.
Figure 7C:
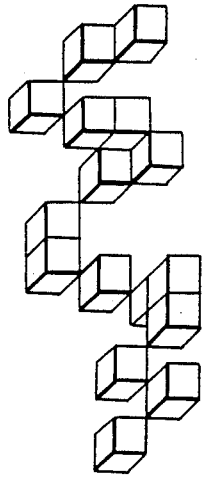
FIG. 7C is a graphical representation of a sequence of voxels arranged in a 26-connected path.

In order to generate other types of voxel-based polygons lacking 18 and 26-connected tunnels, several modifications to the above-described method can be made to achieve voxel-based polygons lacking 18- and/or 26-connected tunnels as illustrated, for example, in FIGS. 7E and 7F, respectively.

Referring to FIGS. 7D-7F and FIGS. 10, 10A and 10B, in particular, the above method of scan-conversion can be modified by carrying out the following changes, as described below.

First, a deferment logic variable is defined. Using this deferment logic variable, the number of voxel scan-lines is controlled.

At the end of the inner loop (i.e. the u-loop) and before commencing the (v+1)-th scan-line, the initial values for the coordinate direction w on the first and last edges of the active edge list, are determined. If these determined values of w for the (v+1)-th scan-line are different from those values for w determined for the previous v-th scan-line, then the deferment logic variable is set to an "on" value. In this case, runs of voxels in the (v+1)-th scan-line with the unchanged depth value w, are generated, thereby filling-in (i.e. "padding") with runs of voxels, in between consecutive scan-lines as to avoid the generation of any 18-connected tunnels between consecutive scan-lines.

In order to generate voxel-based polygons lacking 18- and 26-connected tunnels, additional voxels need to be placed within the scan-lines.

Specifically, additional voxels are placed within the scan-line when a decision is made to change the depth coordinate value w, that is, during the decisional process for determining the coordinate value w, while inside the inner loop (i.e. the u-loop).

In order to achieve a voxel-based polygon representation lacking 18-connected tunnels, a single voxel is placed at coordinate values u, v and w+1, or, u, v and w−1, in addition to the one which is always placed at u, v and w.

In order to achieve a voxel-based polygon representation lacking 26-connected tunnels, a pair of voxels is placed at coordinate values u, v and w+1, and u, v and w−1, in addition to the one which is always placed at u, v and w.

Figure 11:
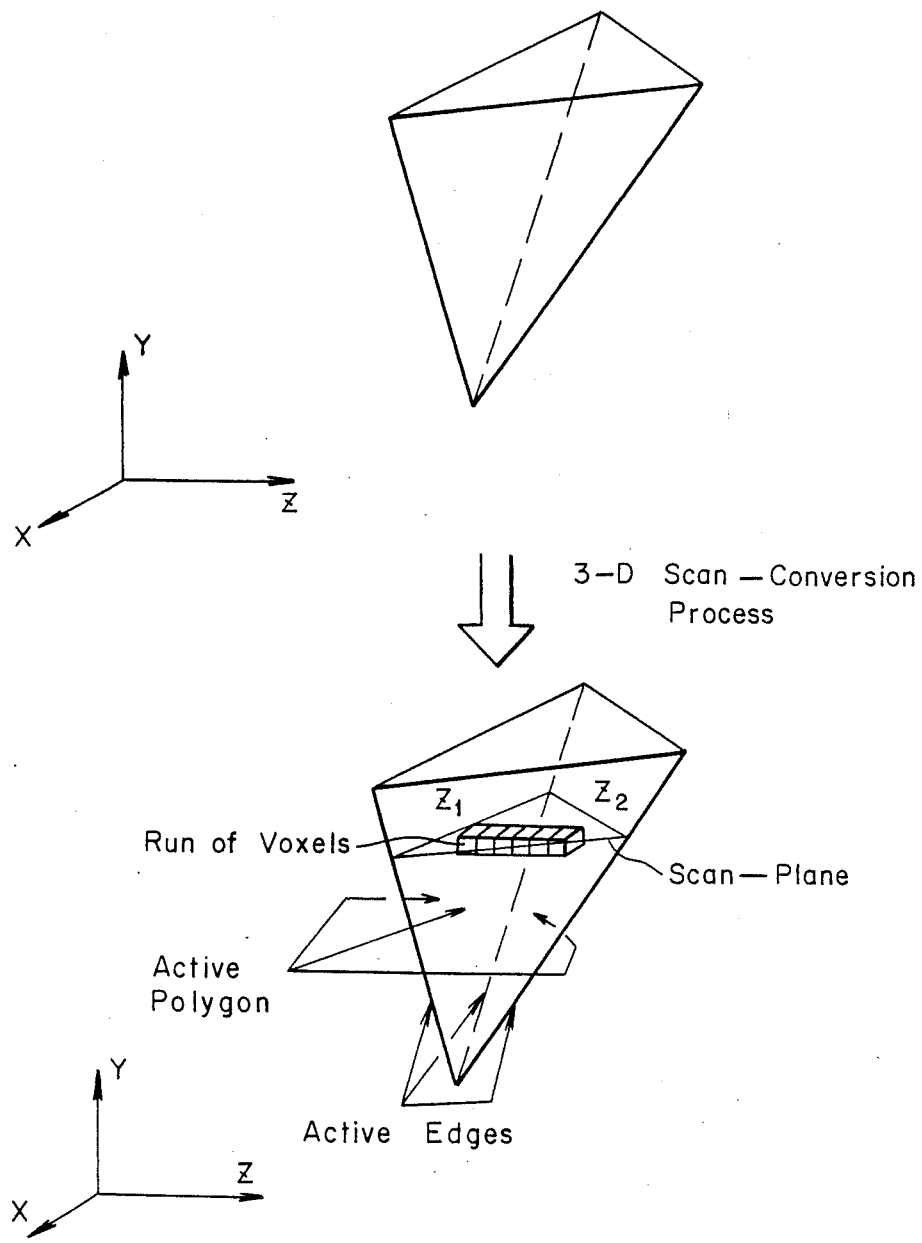
FIG. 11 is a schematic representation of a process of scan-converting continuous 3-D polyhedral objects, i.e. pyramids, represented in 3-D geometric space, into 3-D voxel-based representations thereof in 3-D voxel-image space, according to the principles of the present invention.
Figure 11A:
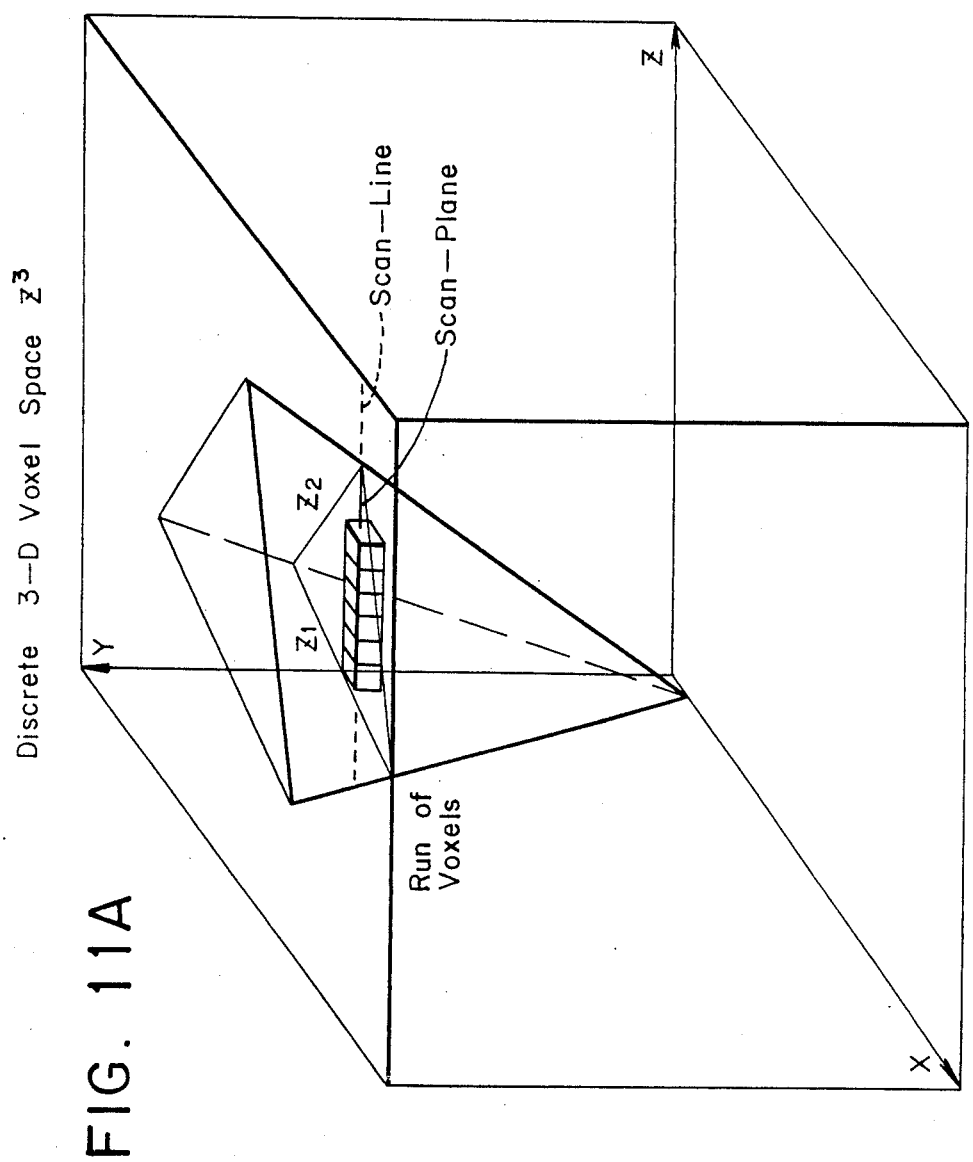
FIG. 11A is a schematic representation of the 3-D voxel-based representation of the 3-D pyramid of FIG. 11, shown within finite boundaries of discrete 3-D voxel space, where a run of voxels are placed along a scan-line in a scan-plane of discrete 3-D voxel space $Z^3$, during the scan-conversion process of the present invention.

Referring now to FIGS. 11, 11A, 11B, 11Bi, 11Bii and 11C, method for scan-converting a continuous 3-D polyhedron with a discrete set of voxels representing the polyhedron in discrete 3-D voxel space $Z^3$, will now be described below as follows.

For purposes of illustration, the case of a 3-D pyramid having three polygons, six edges, four vertices, no holes and which is not self-intersecting as shown in FIG. 11, will be considered.

In general, the method of the present invention allows the scan-conversion of 3-D polyhedra, by scan-converting its polygonal boundary, and/or its interior volume bounded by the polygonal boundary.

The polygonal boundary is a closed polygonal mesh, where each of its constituent polygons can be scan-converted using the method of scan-converting 3-D polygons described hereinbefore. Thus, the preferred embodiment of the method for scan-converting the interior volume of the polyhedra, will be described in detail below as follows.

In the embodiment of this method of the present invention to be described below, the dimensional extent of the 3-D polyhedron in $R^3$space is completely within the dimensional extent of the discrete 3-D voxel space $Z^3$, of, for example, the Cubic Frame Buffer 2 illustrated in FIG. 1. However, the method of the present invention is capable of scan-converting 3-D polyhedra having dimensional extents in $R^3$space that are greater than a dimensional extent of $Z^3$ space, into which the polyhedra is to be converted. This use is known as "clipping".

The first stage of the scan-conversion method involves computing the values of the coefficients of the approximate plane equation of each polygon comprising the polyhedron. Numerical formulas for such computations are known in the art and have been referred to hereinbefore. These coefficients form part of the geometrical parameters of the polyhedra.

In addition, this initialization step involves transforming the geometrical parameters of the polyhedron into integer-based geometrical parameters. Specifically, for each polygon in the polygon list, the integer "initial depth decision process parameters" as discussed in the method for scan-converting 3-D polygons, and for each edge in the edge list, the integer "edge decision process parameters" as discussed in the method of scan-converting 3-D polygons as well, are computed as discussed in that particular method of 3-D scan-conversion.

Notably, these two sets of "decision process parameters" govern the decision processes for determining (i) the initial z value along each polygon, and (ii) the x values along each edge, respectively.

The next stage of the scan-conversion method involves computing from the polyhedron vertices, the minimum and maximum values of the x and y coordinates, $x_o$ and $x_f$ and $y_o$ and $y_f$, respectively In order to carry out the method where the 3-D polygon has a dimensional extent greater than a dimensional extent of the discrete 3-D voxel space $Z^3$ (i.e. case of "clipping"), these values $x_o$, $y_o$ and $x_f$ and $y_f$ are bounded, i.e. limited, by the minimum and maximum values of the corresponding coordinate directions in discrete 3-D voxel space $Z^3$.

The next stage of the method involves ordering (i.e. sorting) the edge list by ascending values of the y coordinate of the first endpoint. This process is carried out in the manner as described hereinbefore in the method of scan-converting 3-D polygons.

Entering the outer loop (i.e. the y-loop) of the method hereof, where integer y ranges between the bounded values of y to $y_f$, the following steps are carried out. Each y coordinate value in the loop corresponds to the y-th scan-plane parallel to the coordinates direction plane x-z, as illustrated in FIG. 11, for example.

The current y coordinate direction value is placed in the corresponding address register of the Cubic Frame Buffer 2 in FIG. 1. Thereafter, for each integer value y defining the y-th scan-plane, a sequence of scan-lines are defined parallel to the z coordinate axis. On each x-th scan-line, a sequence of voxel runs is specified between pairs of polygons which intersect the y-th scan-plane. These runs preferably are rectilinear and can be written into the Cubic Frame Buffer 2, at once as a single unit, exploiting the parallel memory organization of the system as described in "Memory Organization for a Cubic Frame Buffer", cited hereinbefore.

In order to efficiently determine the voxel runs, an active edge list and an active polygon list is maintained in a manner as previously described in the method of scan-converting 3-D polygons. Such a procedure involves inserting, deleting, and reordering of the items in the lists.

Entering now the inner loop (i.e. the x-loop), where each x value defines the x-th scan-line in the y-th scan-plane, the following operations are conducted.

For x values ranging between the x values of the first and last edges in the active edge, the following steps are performed. First, for each polygon "p" in the active polygon list, the z value of the polygon (referred to also as "p.w") is updated by depth increment "p.$\Delta w_x$", which is specific to polygon p.

Secondly, the active polygon list is reordered to accommodate a "non-simple" polyhedron.

Thirdly, for each polygon which has an edge "1" in the active edge list, and which the latter intersects the current x-th scan-line, the following operations are performed. In the case where the polygon of concern is "new" (previously was not in the active polygon list), it is inserted into the active polygon list in such a location therein, so as to preserve the order of the polygon in the active polygon list with respect to the z coordinate direction. In other words, the active polygon list is ordered with respect to the z coordinate direction. In addition, the initial z coordinate value of the new polygon "p.w", is computed by the formula recited in FIG. 11Bi, for "case new".

In the case where the polygon of concern is "old" (i.e. already present in the active edge list), the polygon z coordinate value "p.w" along the edge "1" for the next y-th scan plane, is then computed in one of several possible ways. For example, using a brute-force floating-point computational approach, this "p.w" value is updated by the following value:

$$1.\Delta u\ w + p.\ \Delta w_y,$$

where $1.\Delta u\ w$ is the depth edge increment and where $p.\Delta w_y$ is the polygon depth increment in the y coordinate direction.

On the other hand, using a strictly integer-based decisional approach, the "p.w" value is updated in a manner similar to the initial depth updating decisional process described hereinbefore, for scan-converting 3-D polygons.

In all cases, polygon "p." is classified as being the "in" polygon (i.e. starting a run of voxels which is inside the polyhedron) or the "out" polygon (i.e. terminating the run of voxels).

The last step of the inner loop (i.e. x-loop), involves placing the runs of voxels along x-th scan-line in the y-th scan-plane, into the Cubic Frame Buffer 2. In FIGS. 11B and 11Bii, this step of the method is referred to as "DEPTH FILL", as this is suggestive of the operation, i.e. filling in voxels along the z coordinate direction.

The "DEPTH FILL" operation involves traversing the active polygon list and selecting consecutive pairs of polygons in the list. The integer part of z coordinate values (referred to in FIG. 11Bii as "current polygon.w", of each consecutive pair of polygons, defines a voxel run starting at the first z coordinate value, "z", and terminating at the second z coordinate value, $z_2$, also illustrated in FIGS. 11, 11A and 11Bii. These $z_1$ and $z_2$ values are loaded into respective address registers of the Cubic Frame Buffer, and the $z_1$–$z_2$ voxel run is written into the Cubic Frame Buffer 2 in a single operation.

By carrying out all of the above steps, the entire interior volume of the polyhedron is scan-converted into a set of discrete set of voxels in $Z^3$ space, with no internal cavities present.

The above scan conversion methods have been implemented in pseudo-C programming code and shown in FIGS. 11B and 11C, for the case where the 3-D polygon in $R^3$ space, cannot and can have a dimensional extent in $R^3$ space greater than a dimensional extent in $Z^3$ space.

While the particular embodiments shown and described above have proven to be useful in many applications involving the voxel-based graphics arts, further modifications herein disclosed will occur to persons skilled in the art to which the present invention pertains and also such modifications are deemed to be within the scope and spirit of the present invention defined by the appended claims.

What is claimed is:

1. A method of converting a continuous 3-D geometrical representation of a 3-D polygon into a discrete set of connected voxels representing said 3-D polygon in 3-D discrete voxel space of a voxel-based system, each said voxel being specified by integer x, y and z coordinate values said 3-D polygon being defined by an edge list representing a closed sequence of edges, said edge list including edges being a 3-D straight line segment defined by first and second endpoints forming the vertices of said 3-D polygon, said vertices of said 3-D polygon specifying a plane equation of said 3-D polygon, said 3-D discrete voxel space being characterized by orthogonal x, y, and z coordinate directions, said method comprising the sequence of steps of:

(a) specifying a generalized coordinate system having orthogonal coordinate directions u, v and w, which form three principal planes u-v, u-2, and v-w, said 3-D discrete voxel space being characterized by said u, v and w coordinate directions, each said voxel being specified by integer u, v and w coordinate values, said u, v and w coordinate directions corresponding to said x, y and z coordinate directions in such a way that said polygon has a projection of greatest area on said u-v plane and has a coordinate direction extent of smallest value along said w coordinate direction, said approximate plane equation being specified by plane equation coefficient $\alpha$, $\beta$ and $\Gamma$ of said generalized coordinate directions u, v and w, respectively, and said coordinate direction w being defined as the depth direction of said polygon in said generalized coordinate direction;

(b) determining from said vertices, the minimum and maximum values of said u, v and w coordinate directions;

(c) defining an integer decision variable for said w coordinate direction, first and second integer decision threshold, integer decision variable increments and integer depth increments along each of said u and v coordinate directions, said definitions of said integer variables, decision thresholds, decision variable increments and depth increments being based on said $\alpha$, $\beta$ and $\Gamma$ plane equation coefficients;

(d) determining the initial value for said coordinate direction value w for said vertex having said minimum value for said v coordinate direction;

(e) for each said edge in said edge list, determining
  (i) the slope of said edge in said u-v plane based on said first and second end points of said edge, and
  (ii) the depth increment along said edge based upon said u-v slope determined in substep (i) and said integer depth increment along said u-coordinate direction;

(f) ordering said edge list by ascending value of said v coordinate direction of said first endpoint; and (g) converting said continuous 3-D polygon into said discrete set of voxels by stepping along said coordinate directions u and v and using decisional logic process for determining the integer value of said coordinate direction w, said conversion employing said edge list, said slopes of said edges in said u-v plane, said depth increment along said edges, said integer decision variable, said first and second integer decision thresholds, and said integer depth increments along each of said u and v coordinate directions.

2. The method of claim 1, wherein step (g) comprises, for each integer value of v between said minimum and maximum values thereof which specify a v-th scan line parallel to said generalized coordinate direction u, performing in a loop fashion, the following sequence of steps:

(i) determining the coordinate values of said u coordinate direction corresponding to the endpoints of voxel runs along said v-th scan line which are contained within said polygon; and
(ii) determining for each voxel in said voxel run, the integer value of said coordinate direction w.

3. The method of claim 2, wherein step (i) comprises
(1) forming an active edge list from said edge list, said active edge list being a subset of said edge list in which said edges intersect with said v-th scan line and said active edge list being ordered by ascending said coordinate direction value u, said edge list having a first and last edge,
(2) for each said edge in said edge list, stepping along said edge according to said slope of said edge determined in step (d)(i),
(3) reordering said active edge list,
(4) for each edge in said edge list, in which the v-th coordinate of said first endpoint equals said coordinate value v, inserting said edge into said active edge list so as to preserve the order of said edges in said active edge list, and
(5) for each edge in said active edge list in which the v-th coordinate of said second endpoint equals said coordinate value v,
deleting said edge from said active edge list.

4. The method of claim 2, wherein step (ii) comprises
(1) setting an initial value for said integer coordinate direction value w on said first edge of said active edge list, (2) for each coordinate direction value u in the range between said u coordinate values of said first and last edges in said active edge list,
  (I) placing a voxel in said discrete 3-D voxel space at aid coordinate values, u, v and w if said coordinate direction value u is determined to be inside said polygon,
  (110 for each voxel in said range, determining said integer coordinate value in said w coordinate direction, said determination of said integer coordinate value w being determined employing said integer decision variable, first and second integer decision thresholds and said integer depth increments, and
  (III) updating said integer decision variable using said integer decision variable increments, and
(3) updating said initial value for said coordinate direction value w on said first edge of said active edge list, said updating employing said integer depth increment along said coordinate direction v, and said depth increment along said first edge.

5. The method of claim 2, wherein step (ii) comprises
(1) defining a deferment logic variable,
(2) setting an initial value for said integer coordinate direction value w on said first edge of said active edge list, said setting employing said deferment logic variable,
(3) for each coordinate direction value u in the range between said u-th coordinate values of said first and last edges in said active edge list,
  (I) for each voxel in said range, determining said integer coordinate value in said w coordinate direction, said determination of said integer coordinate value w employing said integer decision variable, first and second integer decision thresholds and said integer depth increments,
  (II) placing voxels in said discrete 3-D voxel space at said coordinate values if said coordinate direction value u is determined to be inside said polygon, and
  (III) updating said integer decision valuable using said integer decision variable increments,
(4) updating said initial values for said coordinate direction value w on said first and last edges of said active edge list, said updating employing said integer depth increment along said coordinate direction v, said depth increment along said first and last edges, and said deferment logic variable, and
(5) determining the value of said deferment logic variable ion the basis of the amount of change in said initial values in step (4).

6. The method of claim 5, wherein step (3)(II) comprises
placing a pair of voxels in said discrete 3-D voxel space at coordinate values u, v and w, and u, v and w+1.

7. The method of claim 5, wherein step (3)(II) comprises
placing a pair of voxels in said discrete 3-D voxel space at coordinate values u, v and w, and u, v and w−1.

8. The method of claim 5, wherein step (3)(II) comprises
placing a triplet of voxels in said discrete 3-D voxel space at coordinate values u, v and w, u, v and w+1, and u, v and w−1.

9. The method of claim 1, wherein said method further comprises before step (g), for each said edge in said edge list,
(1) defining an integer initial depth decision variable, integer initial depth thresholds, integer initial depth decision variable increments, and integer initial depth increments,
(2) determining said integer initial depth thresholds, said integer initial depth decision variable increments, and said integer initial depth increments, said determination employing said integer depth increments and said first and second endpoints of said edge,
(3) for each integer value of v between said first and last values thereof which specify a v-th scan line parallel to said generalized coordinate direction u, performing in a loop fashion, the following sequence of steps,
  (i) determining the coordinate values of said u coordinate direction, corresponding to the endpoints of voxel runs along said v-th scan line which are contained within said polygon, and
  (ii) for each coordinate direction value u in the range between said u coordinate values of said first and last edges in said active edge list, determining the integer value of said coordinate direction w, for each voxel in said range,
(4) determining said integer initial value for said coordinate direction value w on said first edge of said active edge list, said determination employing said integer initial depth decision variable, said integer initial depth threshold, and said integer initial depth increments, and
(5) updating said integer initial depth decision variable, using said integer initial depth decision variable increments.

10. The voxel-based representation formed by the method of claim 1.

11. The method of claim 1, wherein step (e) further comprises
defining an integer edge decision variable for said edge in said edge list, integer edge decision thresholds, integer u increments for said edge in said edge list, and integer edge decision variable increments, and
determining the values of said integer edge decision thresholds, said integer u increments and said integer edge decision variable increments, said determination using first and second end points of said edge, and wherein step (g) comprises
for each integer value of v between said first and last values thereof which specify a v-th scan line parallel to said generalized coordinate direction u, performing in a loop fashion, the following sequence of steps,
  (i) determining the coordinate values of said u coordinate direction, corresponding to the endpoints of voxel runs along said v-th scan line which are contained within said polygon, said determination being carried out by performing the following steps,
(1) forming an active edge list from said edge list, said active edge list being a subset of said edge list in which said edges intersect with said v-th scan line and said active edge list being ordered by ascending said coordinate direction value u, said edge list having a first and last edge,
(2) for each said edge in said edge list, determining the integer value in said coordinate direction u along said edge, said determination being based upon said integer edge decision variable, said integer edge decision threshold, and said integer u increments, and updating said integer edge decision variable using said integer edge decision variable increments,
(3) reordering said active edge list,
(4) for each edge in said edge list, in which the v-th coordinate of said first endpoint equals said coordinate value v, inserting said edge into said active end list so as to preserve the order of said edges in said active edge list, and
(5) for each edge in said edge list in which the v-th coordinate of said second endpoint equals said coordinate value v, deleting said edge from said active edge list; and
(ii) determining for each voxel in said voxel run, the integer value of said coordinate direction w.

12. The method of claim 1, wherein said polygonal object comprises a plurality of connected 3-D polygons; and said method further comprises performing steps (a) and (b) for each said 3-D polygon so as to generate a 3-D voxel based representation for said plurality of connected 3-D polygons.

13. The method of claim 12, wherein said method further comprises before performing steps (a) and (b), for each said 3-D polygon, defining a generalized coordinate system in which said polygon is represented in substantially the same form for any orientation of said polygon in said continuous 3-D geometric space.

14. The method of claim 13, where, in said definition step, said generalized coordinate system is expressed in terms of orthogonal coordinate directions u, v, and w which form three principal planes u-v, u-w, and v-w, where said polygon has a projection of greatest area on said u-v plane and has a coordinate direction extent of smallest value along said w coordinate direction.

* * * * *